(12) United States Patent
Allen et al.

(10) Patent No.: US 10,476,830 B2
(45) Date of Patent: Nov. 12, 2019

(54) EPHEMERAL GALLERY OF EPHEMERAL MESSAGES

(71) Applicant: SNAP INC., Santa Monica, CA (US)

(72) Inventors: Nicholas Allen, Venice, CA (US);
Donald Giovannini, Venice, CA (US);
Chia-Yi Lin, Venice, CA (US); Robert Murphy, Venice, CA (US); Evan Spiegel, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/702,511

(22) Filed: Sep. 12, 2017

(65) Prior Publication Data

US 2017/0374003 A1    Dec. 28, 2017

Related U.S. Application Data

(63) Continuation of application No. 15/224,312, filed on Jul. 29, 2016, which is a continuation of application
(Continued)

(51) Int. Cl.
*G06F 15/16* (2006.01)
*H04L 12/58* (2006.01)
(Continued)

(52) U.S. Cl.
CPC .......... *H04L 51/22* (2013.01); *G06F 3/0482* (2013.01); *G06F 3/04847* (2013.01);
(Continued)

(58) Field of Classification Search
CPC ...................................................... H04L 51/22
(Continued)

(56) References Cited

U.S. PATENT DOCUMENTS

| 4,581,634 A | 4/1986 | Williams |
| 4,975,690 A | 12/1990 | Torres |

(Continued)

FOREIGN PATENT DOCUMENTS

| CA | 2887596 A1 | 7/2015 |
| CA | 2894332 C | 8/2018 |

(Continued)

OTHER PUBLICATIONS

US 10,075,404 B1, 09/2018, Allen et al. (withdrawn)
(Continued)

*Primary Examiner* — Thuong Nguyen
(74) *Attorney, Agent, or Firm* — Schwegman Lundberg & Woessner, P.A.

(57) ABSTRACT

A server maintains a gallery of ephemeral messages. Each ephemeral message is posted to the gallery by a user for viewing by recipients via recipient devices. In response to a gallery view request from any of the recipient devices, the ephemeral messages in the gallery are displayed on the requesting device in automated sequence, each message being displayed for a respective display duration before display of the next message in the gallery. Each ephemeral message has an associated message availability parameter, at the expiry of which the ephemeral message is made unavailable for viewing as part of the gallery. At expiry of the message availability parameter of the last posted message, the gallery is made unavailable for viewing upon request by any recipient.

20 Claims, 10 Drawing Sheets

Related U.S. Application Data

No. 14/505,478, filed on Oct. 2, 2014, now Pat. No. 9,537,811.

(51) Int. Cl.

| | | |
|---|---|---|
| *G06F 21/62* | (2013.01) | |
| *G06Q 50/00* | (2012.01) | |
| *G06F 3/0482* | (2013.01) | |
| *G06F 3/0484* | (2013.01) | |
| *H04L 29/08* | (2006.01) | |

(52) U.S. Cl.
CPC .............. *G06F 21/62* (2013.01); *G06Q 50/01* (2013.01); *H04L 51/10* (2013.01); *H04L 67/2842* (2013.01)

(58) Field of Classification Search
USPC ......... 709/206, 217; 715/203–205, 702, 733, 715/863
See application file for complete search history.

(56) References Cited

U.S. PATENT DOCUMENTS

| | | |
|---|---|---|
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,290,504 B1 | 9/2001 | Benitz et al. |
| 6,310,694 B1 | 10/2001 | Okimoto et al. |
| 6,317,789 B1 | 11/2001 | Rakavy et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,586 B2 | 11/2002 | Ogilvie et al. |
| 6,499,016 B1 | 12/2002 | Anderson |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,724,403 B1 | 4/2004 | Santoro et al. |
| 6,757,713 B1 | 6/2004 | Ogilvie et al. |
| 6,834,195 B2 | 12/2004 | Brandenberg et al. |
| 6,836,792 B1 | 12/2004 | Chen |
| 6,898,626 B2 | 5/2005 | Ohashi |
| 6,970,088 B2 | 11/2005 | Kovach |
| 6,980,909 B2 | 12/2005 | Root et al. |
| 6,981,040 B1 | 12/2005 | Konig et al. |
| 7,004,394 B2 | 2/2006 | Kim |
| 7,020,494 B2 | 3/2006 | Spriestersbach et al. |
| 7,027,124 B2 | 4/2006 | Foote et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,203,380 B2 | 4/2007 | Chiu et al. |
| 7,206,568 B2 | 4/2007 | Sudit |
| 7,227,937 B1 | 6/2007 | Yoakum et al. |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,315,823 B2 | 1/2008 | Bröndrup |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,478,402 B2 | 1/2009 | Christensen et al. |
| 7,496,347 B2 | 2/2009 | Puranik |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,668,537 B2 | 2/2010 | DeVries |
| 7,703,140 B2 | 4/2010 | Nath et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,449 B1 | 12/2010 | Martino et al. |
| 7,912,896 B2 | 3/2011 | Wolovitz et al. |
| 7,934,156 B2 | 4/2011 | Forstall et al. |
| 8,001,204 B2 | 8/2011 | Burtner et al. |
| 8,082,255 B1 | 12/2011 | Carlson, Jr. et al. |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,417 B1 | 4/2012 | Lee |
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,285,199 B2 | 10/2012 | Hsu et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,405,773 B2 | 3/2013 | Hayashi et al. |
| 8,418,067 B2 | 4/2013 | Cheng et al. |
| 8,423,409 B2 | 4/2013 | Rao |
| 8,428,453 B1 | 4/2013 | Spiegel et al. |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |

(56) References Cited

U.S. PATENT DOCUMENTS

| | | |
|---|---|---|
| 8,570,907 B2 | 10/2013 | Garcia, Jr. et al. |
| 8,660,358 B1 | 2/2014 | Bergboer et al. |
| 8,660,793 B2 | 2/2014 | Ngo et al. |
| 8,682,350 B2 | 3/2014 | Altman et al. |
| 8,686,962 B2 | 4/2014 | Christie |
| 8,687,021 B2 | 4/2014 | Bathiche et al. |
| 8,718,333 B2 | 5/2014 | Wolf et al. |
| 8,724,622 B2 | 5/2014 | Rojas |
| 8,744,523 B2 | 6/2014 | Fan et al. |
| 8,745,132 B2 | 6/2014 | Obradovich |
| 8,761,800 B2 | 6/2014 | Kuwahara |
| 8,775,401 B2 | 7/2014 | Zhou et al. |
| 8,775,972 B2 | 7/2014 | Spiegel |
| 8,788,680 B1 | 7/2014 | Naik |
| 8,788,947 B2 | 7/2014 | Putz et al. |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,909,679 B2 | 12/2014 | Roote et al. |
| 8,909,714 B2 | 12/2014 | Agarwal et al. |
| 8,909,725 B1 | 12/2014 | Sehn |
| 8,914,752 B1 | 12/2014 | Spiegel |
| 8,925,106 B1 | 12/2014 | Steiner et al. |
| 8,995,433 B2 | 3/2015 | Rojas |
| 9,015,285 B1 | 4/2015 | Ebsen et al. |
| 9,026,943 B1 | 5/2015 | Spiegel |
| 9,037,577 B1 | 5/2015 | Saylor et al. |
| 9,040,574 B2 | 5/2015 | Wang et al. |
| 9,055,416 B2 | 6/2015 | Rosen et al. |
| 9,063,638 B1 | 6/2015 | Schrock et al. |
| 9,083,770 B1 | 7/2015 | Dröse et al. |
| 9,094,137 B1 | 7/2015 | Sehn et al. |
| 9,098,832 B1 | 8/2015 | Scardino |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,123,074 B2 | 9/2015 | Jacobs |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,319,472 B2 | 4/2016 | Cathcart et al. |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,417,754 B2 | 8/2016 | Smith |
| 9,430,783 B1 | 8/2016 | Sehn |
| 9,443,227 B2 | 9/2016 | Evans et al. |
| 9,459,778 B2 | 10/2016 | Hogeg et al. |
| 9,477,391 B2 | 10/2016 | Flynn, III et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,542,422 B2 | 1/2017 | Duggal et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,854,219 B2 | 12/2017 | Sehn |
| 9,961,520 B2 | 5/2018 | Brooks et al. |
| 10,133,705 B1 | 11/2018 | Allen et al. |
| 10,182,311 B2 | 1/2019 | Sehn |
| 10,200,813 B1 | 2/2019 | Allen et al. |
| 10,284,508 B1 | 5/2019 | Allen et al. |
| 10,311,916 B2 | 6/2019 | Sehn |
| 10,416,845 B1 | 9/2019 | Allen et al. |
| 2001/0028787 A1 | 10/2001 | Nomura et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0171669 A1 | 11/2002 | Meron et al. |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0217106 A1 | 11/2003 | Adar et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0205480 A1 | 10/2004 | Moore |
| 2004/0205514 A1 | 10/2004 | Sommerer et al. |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0071435 A1 | 3/2005 | Karstens |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0004630 A1 | 1/2006 | Criddle et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0127054 A1 | 6/2006 | Matsuyama |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0003221 A1 | 1/2007 | Hamada et al. |
| 2007/0004426 A1 | 1/2007 | Pfleging et al. |
| 2007/0028183 A1 | 2/2007 | Ostojic et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |

(56) References Cited

U.S. PATENT DOCUMENTS

| | | |
|---|---|---|
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0106706 A1 | 5/2007 | Ahrens et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2007/0299807 A1 | 12/2007 | Lea et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0046476 A1 | 2/2008 | Anderson et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222158 A1 | 9/2008 | Saika |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0263103 A1 | 10/2008 | Mcgregor et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0316181 A1 | 12/2008 | Nurmi |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0169062 A1 | 7/2009 | Cheung et al. |
| 2009/0177299 A1 | 7/2009 | Marinus |
| 2009/0187825 A1 | 7/2009 | Sandquist et al. |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0235155 A1 | 9/2009 | Ueda |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0284658 A1 | 11/2009 | Cho |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0001980 A1 | 1/2010 | Kim et al. |
| 2010/0011316 A1 | 1/2010 | Sar et al. |
| 2010/0039505 A1 | 2/2010 | Inoue et al. |
| 2010/0062794 A1 | 3/2010 | Han |
| 2010/0073509 A1 | 3/2010 | Shioji |
| 2010/0082427 A1 | 4/2010 | Burgener et al. |
| 2010/0082693 A1 | 4/2010 | Hugg et al. |
| 2010/0100729 A1 | 4/2010 | Read et al. |
| 2010/0113065 A1 | 5/2010 | Narayan et al. |
| 2010/0115281 A1 | 5/2010 | Camenisch et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0156933 A1 | 6/2010 | Jones et al. |
| 2010/0159944 A1 | 6/2010 | Pascal et al. |
| 2010/0161635 A1 | 6/2010 | Dey |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0185987 A1 | 7/2010 | Yang et al. |
| 2010/0191631 A1 | 7/2010 | Weidmann |
| 2010/0197318 A1 | 8/2010 | Peterson et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0199227 A1 | 8/2010 | Xiao et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0251143 A1 | 9/2010 | Thomas et al. |
| 2010/0257196 A1 | 10/2010 | Waters et al. |
| 2010/0259386 A1 | 10/2010 | Holley et al. |
| 2010/0273463 A1 | 10/2010 | Bonnefoy |
| 2010/0273509 A1 | 10/2010 | Sweeney et al. |
| 2010/0281045 A1 | 11/2010 | Dean |
| 2010/0293105 A1 | 11/2010 | Blinn et al. |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |

(56) References Cited

U.S. PATENT DOCUMENTS

| | | |
|---|---|---|
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0085059 A1 | 4/2011 | Noh |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0131633 A1 | 6/2011 | Macaskill et al. |
| 2011/0137881 A1 | 6/2011 | Cheng et al. |
| 2011/0141025 A1 | 6/2011 | Tsai |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0184980 A1 | 7/2011 | Jeong et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0306387 A1 | 12/2011 | Moon |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0054811 A1 | 3/2012 | Spears |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0117456 A1 | 5/2012 | Koskimies |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0127196 A1 | 5/2012 | Landry |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0163664 A1 | 6/2012 | Zhu |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0201362 A1 | 8/2012 | Crossan et al. |
| 2012/0208564 A1 | 8/2012 | Clark et al. |
| 2012/0209892 A1 | 8/2012 | Macaskill et al. |
| 2012/0209921 A1 | 8/2012 | Adafin et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254324 A1 | 10/2012 | Majeti et al. |
| 2012/0254325 A1 | 10/2012 | Majeti et al. |
| 2012/0259815 A1 | 10/2012 | Olson |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0288147 A1 | 11/2012 | Fujitani |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0311623 A1 | 12/2012 | Davis et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057489 A1 | 3/2013 | Morton |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0076758 A1 | 3/2013 | Li et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0283167 A1 | 10/2013 | Xu |
| 2013/0290337 A1 | 10/2013 | Lansford et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0028589 A1 | 1/2014 | Reilly |

(56) References Cited

U.S. PATENT DOCUMENTS

| | | |
|---|---|---|
| 2014/0029034 A1 | 1/2014 | Toriyama |
| 2014/0032682 A1 | 1/2014 | Prado et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0059479 A1 | 2/2014 | Hamburg et al. |
| 2014/0082651 A1 | 3/2014 | Sharifi |
| 2014/0089264 A1 | 3/2014 | Talagala et al. |
| 2014/0089314 A1 | 3/2014 | Iizuka et al. |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129627 A1 | 5/2014 | Baldwin et al. |
| 2014/0129953 A1 | 5/2014 | Spiegel |
| 2014/0136985 A1 | 5/2014 | Albir et al. |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0207860 A1 | 7/2014 | Wang et al. |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0266703 A1 | 9/2014 | Dalley, Jr. et al. |
| 2014/0279061 A1 | 9/2014 | Elimeliah et al. |
| 2014/0279128 A1 | 9/2014 | Sagebin |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0298210 A1 | 10/2014 | Park et al. |
| 2014/0304622 A1 | 10/2014 | Jorasch et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0331188 A1 | 11/2014 | Sandstrom et al. |
| 2014/0359024 A1 | 12/2014 | Spiegel |
| 2014/0359032 A1 | 12/2014 | Spiegel et al. |
| 2014/0372844 A1 | 12/2014 | Zumkhawala |
| 2014/0379683 A1 | 12/2014 | Bazaz |
| 2015/0020086 A1 | 1/2015 | Chen et al. |
| 2015/0040011 A1 | 2/2015 | Chun |
| 2015/0046278 A1 | 2/2015 | Pei et al. |
| 2015/0055197 A1 | 2/2015 | Romanoff et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0094106 A1 | 4/2015 | Grossman et al. |
| 2015/0095020 A1 | 4/2015 | Leydon |
| 2015/0116529 A1 | 4/2015 | Wu et al. |
| 2015/0127754 A1 | 5/2015 | Clark et al. |
| 2015/0130178 A1 | 5/2015 | Clements |
| 2015/0142753 A1 | 5/2015 | Soon-shiong |
| 2015/0169827 A1 | 6/2015 | Laborde |
| 2015/0172534 A1 | 6/2015 | Miyakawa et al. |
| 2015/0177937 A1 | 6/2015 | Poletto et al. |
| 2015/0178260 A1 | 6/2015 | Brunson |
| 2015/0199082 A1 | 7/2015 | Scholler et al. |
| 2015/0222814 A1 | 8/2015 | Li et al. |
| 2015/0227602 A1 | 8/2015 | Ramu et al. |
| 2015/0248683 A1 | 9/2015 | Walkingshaw |
| 2015/0261917 A1 | 9/2015 | Smith |
| 2015/0312184 A1 | 10/2015 | Langholz et al. |
| 2015/0326510 A1 | 11/2015 | Tomlinson et al. |
| 2015/0350136 A1 | 12/2015 | Flynn, III et al. |
| 2015/0365795 A1 | 12/2015 | Allen et al. |
| 2015/0367233 A1 | 12/2015 | Hicks et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0034253 A1 | 2/2016 | Bang et al. |
| 2016/0048369 A1 | 2/2016 | Zenoff |
| 2016/0085773 A1 | 3/2016 | Chang et al. |
| 2016/0085863 A1 | 3/2016 | Allen et al. |
| 2016/0085994 A1 | 3/2016 | Pereira |
| 2016/0086670 A1 | 3/2016 | Gross et al. |
| 2016/0092962 A1 | 3/2016 | Wasserman et al. |
| 2016/0099901 A1 | 4/2016 | Allen et al. |
| 2016/0105387 A1 | 4/2016 | Jackson |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0253833 A1 | 9/2016 | Lew |
| 2016/0253912 A1 | 9/2016 | Heilman et al. |
| 2016/0277419 A1 | 9/2016 | Allen et al. |
| 2016/0321708 A1 | 11/2016 | Sehn |
| 2016/0352659 A1 | 12/2016 | Krishnamoorth |
| 2016/0359957 A1 | 12/2016 | Laliberte |
| 2016/0359987 A1 | 12/2016 | Laliberte |
| 2017/0006094 A1 | 1/2017 | Abou Mahmoud et al. |
| 2017/0111617 A1 | 4/2017 | Kuwahara et al. |
| 2017/0149717 A1 | 5/2017 | Sehn |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0310888 A1 | 10/2017 | Wright et al. |
| 2017/0374508 A1 | 12/2017 | Davis et al. |
| 2018/0103002 A1 | 4/2018 | Sehn |
| 2018/0316575 A1 | 11/2018 | Son et al. |
| 2019/0237106 A1 | 8/2019 | Sehn |

FOREIGN PATENT DOCUMENTS

| | | |
|---|---|---|
| CN | 106663264 A | 5/2017 |
| CN | 107004225 A | 8/2017 |
| EP | 2051480 A1 | 4/2009 |
| EP | 2151797 A1 | 2/2010 |
| GB | 2399928 A | 9/2004 |
| KR | 19990073076 A | 10/1999 |
| KR | 20010078417 A | 8/2001 |
| KR | 1020140066795 A | 6/2014 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | 2007092668 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | 2013008238 A1 | 1/2013 |
| WO | WO-2013008238 | 1/2013 |
| WO | WO-2013008251 A2 | 1/2013 |
| WO | WO-2013045753 A1 | 4/2013 |
| WO | WO-2013058897 A1 | 4/2013 |
| WO | 2014006129 A1 | 1/2014 |
| WO | 2014031899 A1 | 2/2014 |
| WO | WO-2014068573 A1 | 5/2014 |
| WO | WO-2014093668 A1 | 6/2014 |
| WO | WO-2014115136 A1 | 7/2014 |
| WO | WO-2014194262 A2 | 12/2014 |
| WO | WO-2015192026 A1 | 12/2015 |
| WO | WO-2016007285 A1 | 1/2016 |
| WO | WO-2016044424 A1 | 3/2016 |
| WO | WO-2016054562 A1 | 4/2016 |

(56) References Cited

FOREIGN PATENT DOCUMENTS

| | | |
|---|---|---|
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016149594 A1 | 9/2016 |
| WO | WO-2016179166 A1 | 11/2016 |
| WO | WO-2016179235 A1 | 11/2016 |
| WO | WO-2017106529 A1 | 6/2017 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"Android Getting Started Guide", Voxer Business, [Online]. Retrieved from the Internet: <https://voxer.com/assets/AndroidGuide.pdf>, (Feb. 1, 2014), 18 pgs.
"U.S. Appl. No. 14/510,016, Advisory Action dated Nov. 30, 2017", 7 pgs.
"U.S. Appl. No. 14/510,016, Non Final Office Action dated Feb. 7, 2018", 36 pgs.
"U.S. Appl. No. 14/510,016, Response filed Jan. 8, 2017 to Final Office Action dated Sep. 8, 2017", 22 pgs.
"U.S. Appl. No. 14/510,016, Response filed Nov. 8, 2017 to Final Office Action dated Sep. 8, 2017", 24 pgs.
"U.S. Appl. No. 14/578,271, Notice of Allowability dated Nov. 29, 2017", 3 pgs.
"U.S. Appl. No. 14/612,692, Examiner Interview Summary dated Nov. 13, 2017", 13 pgs.
"U.S. Appl. No. 14/612,692, Non Final Office Action dated Jan. 9, 2018", 19 pgs.
"U.S. Appl. No. 14/612,692, Response Filed Nov. 22, 2017 to Final Office Action dated Aug. 25, 2017", 11 pgs.
"U.S. Appl. No. 14/723,400, Final Office Action dated Jan. 4, 2016", 14 pgs.
"U.S. Appl. No. 14/723,400, Non Final Office Action dated Jul. 20, 2015", 14 pgs.
"U.S. Appl. No. 14/723,400, Notice of Allowance dated Mar. 28, 2016", 12 pgs.
"U.S. Appl. No. 14/723,400, Notice of Non Compliant Amendment dated Sep. 21, 2015", 2 pgs.
"U.S. Appl. No. 14/723,400, Notice of Non Compliant Amendment dated Nov. 10, 2015", 2 pgs.
"U.S. Appl. No. 14/723,400, Response filed Jan. 29, 2016 to Final Office Action dated Jan. 4, 2016", 8 pgs.
"U.S. Appl. No. 14/723,400, Response filed Aug. 13, 2015 to Non Final Office Action dated Jul. 20, 2015", 7 pgs.
"U.S. Appl. No. 14/723,400, Response filed Sep. 23, 2015 to Notice of Non Compliant Amendment dated Sep. 21, 2015", 5 pgs.
"U.S. Appl. No. 14/723,400, Response filed Nov. 19, 2015 to Notice of Non Compliant Amendment dated Nov. 10, 2015", 5 pgs.
"U.S. Appl. No. 14/967,472, Non Final Office Action dated Jan. 12, 2018", 17 pgs.
"U.S. Appl. No. 14/967,472, Response filed Mar. 16, 2018 Non Final Office Action dated Jan. 12, 2018", 13 pgs.
"U.S. Appl. No. 15/074,029, Non Final Office Action dated Nov. 30, 2017", 16 pgs.
"U.S. Appl. No. 15/074,029, Response filed Feb. 28, 2018 to Non Final Office Action dated Nov. 30, 2017", 12 pgs.
"U.S. Appl. No. 15/152,975, Examiner Interview Summary dated Nov. 13, 2017", 13 pgs.
"U.S. Appl. No. 15/152,975, Non Final Office Action dated Jan. 10, 2018", 18 pgs.
"U.S. Appl. No. 15/152,975, Response filed Nov. 30, 2017 to Final Office Action dated Jun. 30, 2017", 9 pgs.
"U.S. Appl. No. 15/212,095, Final Office Action dated Mar. 14, 2017", 9 pgs.
"U.S. Appl. No. 15/212,095, Non Final Office Action dated Feb. 2, 2017", 8 pgs.
"U.S. Appl. No. 15/212,095, Notice of Allowance dated Jun. 1, 2017", 8 pgs.
"U.S. Appl. No. 15/212,095, Notice of Allowance dated Sep. 8, 2017", 2 pgs.
"U.S. Appl. No. 15/212,095, Response filed Feb. 28, 2017 to Non Final Office Action dated Feb. 2, 2017", 2 pgs.
"U.S. Appl. No. 15/212,095, Response filed May 15, 2017 to Final Office Action dated Mar. 14, 2017", 2 pgs.
"U.S. Appl. No. 15/224,343, Response filed Mar. 5, 2018 to Non Final Office Action dated Oct. 4, 2017", 23 pgs.
"U.S. Appl. No. 15/224,355, Response filed Mar. 6, 2018 to Non Final Office Action dated Sep. 6, 2017", 25 pgs.
"U.S. Appl. No. 15/224,359, Final Office Action dated Apr. 2, 2018", 18 pgs.
"U.S. Appl. No. 15/224,359, Response filed Jan. 22, 2018 to Non Final Office Action dated Jul. 20, 2017", 13 pgs.
"U.S. Appl. No. 15/224,365, Final Office Action dated Apr. 2, 2018", 19 pgs.
"U.S. Appl. No. 15/224,365, Response filed Feb. 8, 2018 to Non Final Office Action dated Aug. 8, 2017", 14 pgs.
"U.S. Appl. No. 15/224,372, Response filed Jan. 8, 2017 to Non Final Office Action dated Aug. 7, 2017", 22 pgs.
"U.S. Appl. No. 15/224,377, Final Office Action dated Jan. 2, 2018", 29 pgs.
"U.S. Appl. No. 15/224,377, Response filed Dec. 6, 2017 to Non Final Office Action dated Aug. 4, 2017", 22 pgs.
"U.S. Appl. No. 15/224,383, Final Office Action dated Feb. 14, 2018", 25 pgs.
"U.S. Appl. No. 15/224,383, Preliminary Amendment filed May 9, 2017", 13 pgs.
"U.S. Appl. No. 15/224,383, Response filed Jan. 3, 2018 to Non Final Office Action dated Aug. 30, 2017", 25 pgs.
"U.S. Appl. No. 15/298,806, Advisory Action dated Jan. 29, 2018", 4 pgs.
"U.S. Appl. No. 15/298,806, Examiner Interview Summary dated Jan. 12, 2018", 3 pgs.
"U.S. Appl. No. 15/298,806, Response filed Jan. 9, 2018 to Final Office Action dated Oct. 24, 2017", 17 pgs.
"Canadian Application Serial No. 2,894,332, Response filed Jan. 24, 2017 to Office Action dated Aug. 16, 2016", 15 pgs.
"European Application Serial No. 14804343.3, Extended European Search Report dated Sep. 29, 2016", 12 pgs.
"European Application Serial No. 15870874.3, Extended European Search Report dated Nov. 29, 2017", 7 pgs.
"International Application Serial No. PCT/US2015/037251, Written Opinion dated Sep. 29, 2015", 4 pgs.
"To Err is Human. To Self Destruct Messages, There is iDelete for iOS", The Apple Google, [Online]. Retrieved from the Internet: http://theapplegoogle.com/2013/04/err-human-destruct-messages-idelete-ios/>, archived on Apr. 12, 2013 at w ayback machine>, 2 pgs.
Fajman, "An Extensible Message Format for Message Disposition Notifications", Request for Comments: 2298, National Institutes of Health, (Mar. 1998), 28 pgs.
U.S. Appl. No. 15/212,095, filed Jul. 15, 2016, Apparatus and Method for Automated Privacy Protection in Distributed Images, U.S. Pat. No. 9,785,796.
U.S. Appl. No. 15/729,582, filed Oct. 10, 2017, Apparatus and Method for Automated Privacy Protection in Distributed Images.
"A Whole New Story", [Online]. Retrieved from the Internet: <https://www.snap.com/en-US/news/>, (2017), 13 pgs.
"Adding a watermark to your photos", eBay, [Online]. Retrieved from the Internet:<URL:http://pages.ebay.com/help/sell/pictures.html>, (accessed May, 24, 2017), 4 pgs.
"U.S. Appl. No. 14/304,855, Corrected Notice of Allowance dated Jun. 26, 2015", 8 pgs.
"U.S. Appl. No. 14/304,855, Final Office Action dated Feb. 18, 2015", 10 pgs.
"U.S. Appl. No. 14/304,855, Non Final Office Action dated Mar. 18, 2015", 9 pgs.

(56) References Cited

OTHER PUBLICATIONS

"U.S. Appl. No. 14/304,855, Non Final Office Action dated Oct. 22, 2014", 11 pgs.
"U.S. Appl. No. 14/304,855, Notice of Allowance dated Jun. 1. 2015", 11 pgs.
"U.S. Appl. No. 14/304,855, Response filed Feb. 25, 2015 to Final Office Action dated Feb. 18, 2015", 5 pgs.
"U.S. Appl. No. 14/304,855, Response filed Apr. 1, 2015 to Non Final Office Action dated Mar. 18, 2015", 4 pgs.
"U.S. Appl. No. 14/304,855, Response filed Nov. 7, 2014 to Non Final Office Action dated Oct. 22, 2014", 5 pgs.
"U.S. Appl. No. 14/494,226, Examiner Interview Summary dated Oct. 27, 2016", 3 pgs.
"U.S. Appl. No. 14/494,226, Final Office Action dated Mar. 7, 2017", 34 pgs.
"U.S. Appl. No. 14/494,226, Non Final Office Action dated Sep. 12, 2016", 32 pgs.
"U.S. Appl. No. 14/494,226, Response filed Jul. 7, 2017 to Final Office Action dated Mar. 7, 2017", 13 pgs.
"U.S. Appl. No. 14/494,226, Response filed Dec. 12, 2016 to Non Final Office Action dated Sep. 12, 2016", 16 pgs.
"U.S. Appl. No. 14/505,478, Advisory Action dated Apr. 14, 2015", 3 pgs.
"U.S. Appl. No. 14/505,478, Corrected Notice of Allowance dated May 18, 2016", 2 pgs.
"U.S. Appl. No. 14/505,478, Corrected Notice of Allowance dated Jul. 22, 2016", 2 pgs.
"U.S. Appl. No. 14/505,478, Final Office Action dated Mar. 17, 2015", 16 pgs.
"U.S. Appl. No. 14/505,478, Non Final Office Action dated Jan. 27, 2015", 13 pgs.
"U.S. Appl. No. 14/505,478, Non Final Office Action dated Sep. 4, 2015", 19 pgs.
"U.S. Appl. No. 14/505,478, Notice of Allowance dated Apr. 28, 2016", 11 pgs.
"U.S. Appl. No. 14/505,478, Notice of Allowance dated Aug. 26, 2016", 11 pgs.
"U.S. Appl. No. 14/505,478, Response filed Jan. 30, 2015 to Non Final Office Action dated Jan. 27, 2015", 10 pgs.
"U.S. Appl. No. 14/505,478, Response filed Mar. 4, 2016 to Non Final Office Action dated Sep. 4, 2015", 12 pgs.
"U.S. Appl. No. 14/505,478, Response filed Apr. 1, 2015 to Final Office Action dated Mar. 17, 2015", 6 pgs.
"U.S. Appl. No. 14/506,478, Response filed Aug. 17, 2015 to Advisory Action dated Apr. 14, 2015", 10 pgs.
"U.S. Appl. No. 14/510,016, Final Office Action dated Sep. 8, 2017", 21 pgs.
"U.S. Appl. No. 14/510,016, Non Final Office Action dated Apr. 21, 2017".
"U.S. Appl. No. 14/510,016, Response Filed Jul. 21, 2017 to Non Final Office Action dated Apr. 21, 2017", 21 pgs.
"U.S. Appl. No. 14/523,728, Non Final Office Action dated Dec. 12, 2014", 10 pgs.
"U.S. Appl. No. 14/523,728, Notice of Allowance dated Mar. 24, 2015", 8 pgs.
"U.S. Appl. No. 14/523,728, Notice of Allowance dated Apr. 15, 2015", 8 pgs.
"U.S. Appl. No. 14/523,728, Notice of Allowance dated Jun. 5, 2015", 8 pgs.
"U.S. Appl. No. 14/523,728, Response filed Aug. 25, 2014 to Non Final Office Action dated Jan. 16, 2015", 5 pgs.
"U.S. Appl. No. 14/529,064, Final Office Action dated Aug. 11, 2015", 23 pgs.
"U.S. Appl. No. 14/529,064, Final Office Action dated Aug. 24, 2016", 23 pgs.
"U.S. Appl. No. 14/529,064, Non Final Office Action dated Mar. 12, 2015", 20 pgs.
"U.S. Appl. No. 14/529,064, Non Final Office Action dated Apr. 6, 2017", 25 pgs.

"U.S. Appl. No. 14/529,064, Non Final Office Action dated Apr. 18, 2016", 21 pgs.
"U.S. Appl. No. 14/529,064, Response filed Feb. 5, 2015 to Restriction Requirement dated Feb. 2, 2015", 6 pgs.
"U.S. Appl. No. 14/529,064, Response filed Mar. 26, 2015 to Non Final Office Action dated Mar. 12, 2015", 8 pgs.
"U.S. Appl. No. 14/529,064, Response filed Jul. 18, 2016 to Non Final Office Action dated Apr. 18, 2016", 20 pgs.
"U.S. Appl. No. 14/529,064, Response filed Oct. 12, 2015 to Final Office Action dated Aug. 11, 2015", 19 pgs.
"U.S. Appl. No. 14/529,064, Restriction Requirement dated Feb. 2, 2015", 5 pgs.
"U.S. Appl. No. 14/539,391, Notice of Allowance dated Mar. 5, 2015", 17 pgs.
"U.S. Appl. No. 14/548,590, Advisory Action dated Nov. 18, 2016", 3 pgs.
"U.S. Appl. No. 14/548,590, Final Office Action dated Jul. 5, 2016", 16 pgs.
"U.S. Appl. No. 14/548,590, Final Office Action dated Sep. 16, 2015", 15 pgs.
"U.S. Appl. No. 14/548,590, Non Final Office Action dated Jan. 9, 2017", 14 pgs.
"U.S. Appl. No. 14/548,590, Non Final Office Action dated Feb. 11, 2016", 16 pgs.
"U.S. Appl. No. 14/548,590, Non Final Office Action dated Apr. 20, 2015", 14 pgs.
"U.S. Appl. No. 14/548,590, Response filed May 10, 2016 to Non Final Office Action dated Feb. 11, 2016", 14 pgs.
"U.S. Appl. No. 14/548,590, Response filed Nov. 7, 2016 to Final Office Action dated Jul. 5, 2016", 14 pgs.
"U.S. Appl. No. 14/548,590, Response filed Dec. 16, 2015 to Final Office Action dated Sep. 16, 2015", 13 pgs.
"U.S. Appl. No. 14/548,590, Response filed Jun. 16, 2015 to Non Final Office Action dated Apr. 20, 2015", 19 pgs.
"U.S. Appl. No. 14/578,258, Examiner Interview Summary dated Nov. 25, 2015", 3 pgs.
"U.S. Appl. No. 14/578,258, Non Final Office Action dated Jun. 10, 2015", 12 pgs.
"U.S. Appl. No. 14/578,258, Notice of Allowance dated Feb. 26, 2016", 5 pgs.
"U.S. Appl. No. 14/578,258, Response filed Dec. 10, 2015 to Non Final Office Action dated Jun. 10, 2015", 11 pgs.
"U.S. Appl. No. 14/578,271, Corrected Notice of Allowance dated Oct. 30, 2017", 2 pgs.
"U.S. Appl. No. 14/578,271, Final Office Action dated Dec. 3, 2015", 15 pgs.
"U.S. Appl. No. 14/578,271, Non Final Office Action dated Aug. 7, 2015", 12 pgs.
"U.S. Appl. No. 14/578,271, Notice of Allowance dated Aug. 1, 2017", 5 pgs.
"U.S. Appl. No. 14/578,271, Notice of Allowance dated Dec. 7, 2016", 7 pgs.
"U.S. Appl. No. 14/578,271, Response filed Feb. 9, 2016 to Final Office Action dated Dec. 3, 2015", 10 pgs.
"U.S. Appl. No. 14/578,271, Response filed Jun. 19, 2015 to Restriction Requirement dated Apr. 23, 2015", 6 pgs.
"U.S. Appl. No. 14/578,271, Response filed Oct. 28, 2015 to Non Final Office Action dated Aug. 7, 2015", 9 pgs.
"U.S. Appl. No. 14/578,271, Restriction Requirement dated Apr. 23, 2015", 8 pgs.
"U.S. Appl. No. 14/612,692, Examiner Interview Summary dated Jan. 29, 2016", 5 pgs.
"U.S. Appl. No. 14/612,692, Examiner Interview Summary dated Jul. 6, 2016", 4 pgs.
"U.S. Appl. No. 14/612,692, Examiner Interview Summary dated Aug. 14, 2015", 3 pgs.
"U.S. Appl. No. 14/612,692, Examiner Interview Summary dated Sep. 8, 2016", 3 pgs.
"U.S. Appl. No. 14/612,692, Final Office Action dated Aug. 15, 2016", 18 pgs.
"U.S. Appl. No. 14/612,692, Final Office Action dated Aug. 25, 2017", 18 pgs.

(56) References Cited

OTHER PUBLICATIONS

"U.S. Appl. No. 14/612,692, Final Office Action dated Nov. 23, 2015", 15 pgs.
"U.S. Appl. No. 14/612,692, Non Final Office Action dated Jan. 3, 2017", 17 pgs.
"U.S. Appl. No. 14/612,692, Non Final Office Action dated Mar. 28, 2016", 15 pgs.
"U.S. Appl. No. 14/612,692, Non Final Office Action dated Jul. 20, 2015", 25 pgs.
"U.S. Appl. No. 14/612,692, Response filed Feb. 23, 2016 to Final Office Action dated Nov. 23, 2015", 10 pgs.
"U.S. Appl. No. 14/612,692, Response filed May 3, 2017 to Non Final Office Action dated Jan. 3, 2017", 18 pgs.
"U.S. Appl. No. 14/612,692, Response filed Nov. 14, 2016 to Final Office Action dated Aug. 15, 2016", 15 pgs.
"U.S. Appl. No. 14/612,692, Response filed Jun. 28, 2016 to Non Final Office Action dated Mar. 28, 2016", 14 pgs.
"U.S. Appl. No. 14/612,692. Response filed Oct. 19, 2015 to Non Final Office Action dated Jul. 20, 2015", 11 pgs.
"U.S. Appl. No. 14/634,417, Advisory Action dated Mar. 14, 2017", 3 pgs.
"U.S. Appl. No. 14/634,417, Examiner Interview Summary dated Aug. 7, 2017", 3 pgs.
"U.S. Appl. No. 14/634,417, Final Office Action dated Jan. 31, 2017", 27 pgs.
"U.S. Appl. No. 14/634,417, Non Final Office Action dated Jun. 8, 2017", 17 pgs.
"U.S. Appl. No. 14/634,417, Non Final Office Action dated Aug. 30, 2016", 23 pgs.
"U.S. Appl. No. 14/634,417, Notice of Allowance dated Oct. 25, 2017", 9 pgs.
"U.S. Appl. No. 14/634,417, Response filed Mar. 2, 2017 to Final Office Action dated Jan. 31, 2017", 23 pgs.
"U.S. Appl. No. 14/634,417, Response filed Sep. 21, 2017 to Non Final Office Action dated Jun. 8, 2017", 16 pgs.
"U.S. Appl. No. 14/634,417, Response filed Nov. 30, 2016 to Non Final Office Action dated Aug. 30, 2016", 18 pgs.
"U.S. Appl. No. 14/682,259, Notice of Allowance dated Jul. 27, 2015", 17 pgs.
"U.S. Appl. No. 14/704,212, Final Office Action dated Jun. 17, 2016", 12 pgs.
"U.S. Appl. No. 14/704,212, Non Final Office Action dated Jun. 16, 2017", 13 pgs.
"U.S. Appl. No. 14/704,212, Non Final Office Action dated Nov. 25, 2016", 13 pgs.
"U.S. Appl. No. 14/704,212, Non Final Office Action dated Dec. 4, 2015", 17 pgs.
"U.S. Appl. No. 14/704,212, Response filed Feb. 27, 2017 to Non Final Office Action dated Nov. 25, 2016", 14 pgs.
"U.S. Appl. No. 14/704,212, Response filed Mar. 4, 2016 to Non Final Office Action dated Dec. 4, 2015", 11 pgs.
"U.S. Appl. No. 14/704,212, Response filed Oct. 17, 2016 to Final Office Action dated Jun. 17, 2016", 12 pgs.
"U.S. Appl. No. 14/738,069, Non Final Office Action dated Mar. 21, 2016", 12 pgs.
"U.S. Appl. No. 14/738,069, Notice of Allowance dated Aug. 17, 2016", 6 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 14/808,283, Notice of Allowance dated Jul. 14, 2016", 8 pgs.
"U.S. Appl. No. 14/808,283, Preliminary Amendment filed Jul. 24, 2015", 8 pgs.
"U.S. Appl. No. 14/841,987, Notice of Allowance dated Mar. 29, 2017", 17 pgs.
"U.S. Appl. No. 14/967,472, Final Office Action dated Mar. 10, 2017", 15 pgs.
"U.S. Appl. No. 14/967,472, Non Final Office Action dated Sep. 8, 2016", 11 pgs.
"U.S. Appl. No. 14/967,472, Preliminary Amendment filed Dec. 15, 2015", 6 pgs.
"U.S. Appl. No. 14/967,472, Response filed Jun. 7, 2017 to Final Office Action dated Mar. 10, 2017", 12 pgs.
"U.S. Appl. No. 14/967,472, Response filed Dec. 5, 2016 to Non Final Office Action dated Sep. 8, 2016", 11 pgs.
"U.S. Appl. No. 14/974,321, Non Final Office Action dated Jun. 29, 2017", 36 pgs.
"U.S. Appl. No. 15/137,608, Preliminary Amendment filed Apr. 26, 2016", 6 pgs.
"U.S. Appl. No. 15/152,975, Final Office Action dated Jun. 30, 2017", 17 pgs.
"U.S. Appl. No. 15/152,975, Non Final Office Action dated Jan. 12, 2017", 36 pgs.
"U.S. Appl. No. 15/152,975, Preliminary Amendment filed May 19, 2016", 8 pgs.
"U.S. Appl. No. 15/152,975, Response filed Jun. 12, 2017 to Non Final Office Action dated Jan. 12, 2017", 13 pgs.
"U.S. Appl. No. 15/208,460, Notice of Allowance dated Feb. 27, 2017", 8 pgs.
"U.S. Appl. No. 15/208,460, Notice of Allowance dated Dec. 30, 2016", 9 pgs.
"U.S. Appl. No. 15/208,460, Supplemental Preliminary Amendment filed Jul. 18, 2016", 8 pgs.
"U.S. Appl. No. 15/224,312, Non Final Office Action dated Oct. 11, 2017", 29 pgs.
"U.S. Appl. No. 15/224,312, Preliminary Amendment filed Feb. 1, 2017", 11 pgs.
"U.S. Appl. No. 15/224,343, Non Final Office Action dated Oct. 4, 2017", 26 pgs.
"U.S. Appl. No. 15/224,343, Preliminary Amendment filed Jan. 31, 2017", 10 pgs.
"U.S. Appl. No. 15/224,355, Examiner Interview Summary dated Oct. 25, 2017", 3 pgs.
"U.S. Appl. No. 15/224,355, Non Final Office Action dated Sep. 6, 2017", 30 pgs.
"U.S. Appl. No. 15/224,355, Preliminary Amendment filed Apr. 3, 2017", 12 pgs.
"U.S. Appl. No. 15/224,359, Non Final Office Action dated Jul. 20, 2017", 33 pgs.
"U.S. Appl. No. 15/224,365, Non Final Office Action dated Aug. 8, 2017", 41 pgs.
"U.S. Appl. No. 15/224,372, Non Final Office Action dated Aug. 7, 2017", 40 pgs.
"U.S. Appl. No. 15/224,372, Preliminary Amendment filed May 5, 2017", 10 pgs.
"U.S. Appl. No. 15/224,377, Non Final Office Action dated Aug. 4, 2017", 41 pgs.
"U.S. Appl. No. 15/224,383, Examiner Interview Summary dated Oct. 25, 2017", 3 pgs.
"U.S. Appl. No. 15/224,383, Non Final Office Action dated Aug. 30, 2017", 26 pgs.
"U.S. Appl. No. 15/224,359, Preliminary Amendment filed Apr. 19, 2017", 8 pgs.
"U.S. Appl. No. 15/298,806, Final Office Action dated Oct. 24, 2017", 15 pgs.
"U.S. Appl. No. 15/298,806, Non Final Office Action dated Jun. 12, 2017", 26 pgs.
"U.S. Appl. No. 15/298,806, Preliminary Amendment filed Oct. 21, 2016", 8 pgs.
"U.S. Appl. No. 15/298,806, Response filed Sep. 12, 2017 to Non Final Office Action dated Jun. 12, 2017", 12 pgs.
"U.S. Appl. No. 15/416,846, Notice of Allowance dated Jul. 19, 2017", 9 pgs.
"U.S. Appl. No. 15/416,846, Preliminary Amendment filed Feb. 18, 2017", 10 pgs.
"U.S. Appl. No. 15/787,467, Preliminary Amendment filed Oct. 26, 2017", 11 pgs.
"BlogStomp", [Online], Retrieved from the Internet: <URL:http://stompsoftware.com/blogstomp>, (accessed May 24, 2017), 12 pgs.

(56) References Cited

OTHER PUBLICATIONS

"Canadian Application Serial No. 2,894,332, Office Action dated Aug. 16, 2016", 4 pgs.
"Canadian Application Serial No. 2,910,158, Office Action dated Dec. 15, 2016", 5 pgs.
"Canadian Application Serial No. 2,910,158, Response filed Apr. 11, 2017 to Office Action dated Dec. 15, 2016", 21 pgs.
"Cup Magic Starbucks Holiday Red Cups come to life with AR app", [Online]. Retrieved from the Internet: <http://www.blastradius.com/work/cup-magic>, (2016), 7 pgs.
"Daily App: InstaPlace (iOS/Android): Give Pictures a Sense of Place", TechPP, [Online]. Retrieved from the Internet: <URL;http://techpp.com/2013/02/15/instaplace-app-review>, (2013), 13 pgs.
"European Application Serial No. 15733026.7, Communication Pursuant to Article 94(3) EPC dated Jul. 28, 2017", 6 pgs.
"European Application Serial No. 15782165.3, Response filed Oct. 17, 2017 to Communication pursuant to Rules 161(1) and 162 EPC dated May 10, 2017", 15 pgs.
"European Application Serial No. 15870861.0, Response filed Aug. 9, 2017 to Communication Pursuant to Rules 161(2) and 162 EPC dated Aug. 4, 2017", 10 pgs.
"How Snaps Are Stored and Deleted", Snapchat, [Online]. Retrieved from the Internet: <URL: https://web.archive.org/web/20130607042322/http://blog.snapchat.com/post/50060403002/how-snaps-are-stored-and-deleted, (May 9, 2013), 2 pgs.
"InstaPlace Photo App Tell The Whole Story", [Online]. Retrieved from the Internet; <https://youtu.be/uF_gFkg1hBM>, (Nov. 8, 2013), 113 pgs.
"International Application Serial No. PCT/EP2008/063682, International Search Report dated Nov. 24, 2008", 3 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/035591, International Preliminary Report on Patentability dated Dec. 22, 2016", 7 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/050424, International Search Report dated Dec. 4, 2015", 2 pgs.
"International Application Serial No. PCT/US2015/050424, Written Opinion dated Dec. 4, 2015", 10 pgs.
"International Application Serial No. PCT/US2015/053811, International Preliminary Report on Patentability dated Apr. 13, 2017", 9 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Preliminary Report on Patentability dated May 4, 2017", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065785, International Preliminary Report on Patentability dated Jun. 29, 2017", 7 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2015/065821, International Preliminary Report on Patentability dated Jun. 29, 2017", 5 pgs.
"International Application Serial No. PCT/US2015/065821, International Search Report dated Mar. 3, 2016", 2 pgs.
"International Application Serial No. PCT/US2015/065821, Written Opinion dated Mar. 3, 2016", 3 pgs.
"International Application Serial No. PCT/US2016/023085, International Preliminary Report on Patentability dated Sep. 28, 2017", 8 pgs.
"International Application Serial No. PCT/US2016/023085, International Search Report dated Jun. 17, 2016", 5 pgs.
"International Application Serial No. PCT/US2016/023085, Written Opinion dated Jun. 17, 2016", 6 pgs.
"International Application Serial No. PCT/US2016/066976, International Search Report dated May 17, 2017", 7 pgs.
"International Application Serial No. PCT/US2016/066976, Invitation to Pay Add'l Fees and Partial Search Rpt dated Mar. 6, 2017", 8 pgs.
"International Application Serial No. PCT/US2016/066976, Written Opinion dated May 17, 2017", 7 pgs.
"International Application Serial No. PCT/US 2015/037251, International Search Report dated Sep. 29, 2015", 7 pgs.
"Introducing Snapchat Stories", [Online]. Retrieved from the Internet:<https://www.youtube.com/watch?v=88Cu3yN-LIM>, (Oct. 3, 2013), 92 pgs.
"iVisit Mobile Getting Started", IVISIT, (Dec. 4, 2013), 1-16.
"Korean Application Serial No. 10-2017-7001104, Response filed Jul. 25, 2017 to Office Action dated Jun. 26, 2017", 20 pgs.
"Korean Office Action Application Serial No. 10-2017-7001104, Office Action dated Jun. 26, 2017", W/English Translation, 12 pgs.
"Macy's Believe-o-Magic", {Online}. Retrieved from the Internet: <https://www.youtube.com/watch?v=xvzRXy3J0Z0>, (Nov. 7, 2011), 102 pgs.
"Macy's Introduces Augmented Reality Experience in Stores across Country as Part of Its 2011 "Believe" Campaign", [Online]. Retrieved from the Internet: <http://www.businesswire.com/news/home/20111102006759/en/Macy%E2%80%99s-Introduces-Augmented-Reality-Experience-Stores-Country>., (Nov. 2, 2011), 6 pgs.
"Pluraleyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.
"Starbucks Cup Magic", {Onliine}. Retrieved from the Internet: <https://www.youtube.com/watch?v=RWwQXi9RG0w>, (Nov. 8, 2011), 87 pgs.
"Starbucks Cup Magic for Valentine's Day", {Online}. Retrieved from the Internet: <https://www.youtube.com/watch?v=8nvqOzjq10w>, (Feb. 6, 2012), 88 pgs.
"Starbucks Holiday Red Cups Come to Life, Signaling the Return of the Merriest Season", [Online]. Retrieved from the Internet: <http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", [Online]. Retrieved from the Internet: URL<https://techcrunch.com/2011/09/08/mobli-filters>, (Sep. 8, 2011), 10 pgs.
Castelluccia, Claude, et al., "EphPub: Toward robust Ephemeral Publishing", Network Protocols (ICNP), 2011 19th IEEE International Conference on, IEEE, (Oct. 17, 2011), 18 pgs.
Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.
Janthong, Isaranu, "Android App Review Thailand", [Online], Retrieved from the Internet:<http://www.android-free-app-review.com/2013/01/instaplace-android-google-play-store.html>, (Jan. 23, 2013), 9 pgs.
Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.
Macleod, Duncan, "Macys Believe-o-Magic App", [Online]. Retrived from the Internet: <URL:http://theinspirationroom.com/daily/2011/macys-believe-o-magic-app>, (Nov. 14, 2011), 10 pgs.
Macleod, Duncan, "Starbucks Cup Magic—Let's Merry", {Online}. Retrieved from the Internet: <URL: http://theinspirationroom.com/daily/2011/starbucks-cup-magic>, (Nov. 12, 2011), 8 pgs.

(56) References Cited

OTHER PUBLICATIONS

Melanson, Mike, "This text message will self destruct in 60 seconds", readwrite.com, [Online]. Retrieved from the Internet: <http://readwrite.com/2011/02/11/this_text_message_will_self destruct_in_60_seconds>, (Feb. 18, 2015).

Notopoulos, Katie, "A Guide to The New Snapchat Filters and Big Fonts", [Online]. Retrieved from the Internet:<https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and For Whatever Reason, Time, Temperature and Speed Overlays", [Online]. Retrieved from the Internet: <https://techcrunch.com/2013/12/20/snapchat-adds-filters-new-font-and-for-some-reason-time-temperature-and-speed-overlays/>, (Dec. 20, 2013), 12 pgs.

Sawers, Paul, "Snapchat for ios lets you send photos to friends and set how long they're visible for", http://thenextweb.com/apps/2012/05/07/ snapchat-for-ios-lets-you-send-photos-to-f riends-and-set-how-long-theyre-visible-for, (May 2012), 1-3 pgs.

Sawers, Paul, "Snapchat for iOS Lets You Send Photos to Friends and Set How long They're Visible For", [Online]. Retrieved from the Internet: <http:/ /thenextweb.com/apps/2012/05/07/Snapchat-for-ios-lets-you-send-photos-to-friends-and-set-how-long-theyre-visiblefor/#! xCjrp>,, (May 7, 2012), 1-5.

Shein, Esther, "Ephemeral Data", Communications of the ACM vol. 56 | No. 9, (Sep. 2013), 20-22.

Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.

Tripathi, Rohit, "Watermark Images in PHP and Save File on Server", [Online]. Retrieved from the Internet: <URL:http://code.rohitink.com/2012/12/28/watermark-images-in-php-and-save-file-on-server/, (Dec. 28, 2012), 4 pgs.

"U.S. Appl. No. 14/967,472, Notice of Allowance dated Jan. 24, 2019", 6 pgs.

"U.S. Appl. No. 15/074,029, Non Final Office Action dated Jan. 23, 2019", 19 pgs.

"U.S. Appl. No. 15/137,608, Amendment and Response filed Jan. 25, 2019 to Non Final Office Action dated Nov. 2, 2018", 13 pgs.

"U.S. Appl. No. 15/152,975, Examiner Interview Summary dated Feb. 4, 2019", 7 pgs.

"U.S. Appl. No. 15/152,975, Response filed Jan. 28, 2019 to Non Final Office Action dated Sep. 28, 2018", 17 pgs.

"U.S. Appl. No. 15/224,372, Resonse filed Jan. 16, 2019 to Non Final Office Action dated Sep. 14, 2018", 18 pgs.

"U.S. Appl. No. 15/224,383, Final Office Action dated Jan. 14, 2019", 15 pgs.

"Canadian Application Serial No. 2,910,158, Response filed Dec. 6, 2018 to Office Action dated Jun. 6, 2018", w/ English Claims, 18 pgs.

"European Application Serial No. 15782165.3, Response filed Jan. 24, 2019 to Communication Pursuant to Article 94(3) EPC dated Sep. 14, 2018", w/ English Claims, 56 pgs.

"U.S. Appl. No. 15/224,377, Final Office Action dated Feb. 6, 2019", 14 pgs.

"U.S. Appl. No. 15/946,990, Response filed Feb. 20, 2019 to Non Final Office Action dated Dec. 3, 2018", 11 pgs.

"U.S. Appl. No. 15/224,343, Amendment and Response filed Feb. 4, 2019 to Non Final Office Action dated Sep. 4, 2018", 18 pgs.

"U.S. Appl. No. 15/224,312, Response filed Feb. 22, 2019 to Non Final Office Action dated Oct. 22, 2018", 14 pgs.

"U.S. Appl. No. 15/224,359, Responce filed Feb. 28, 2019 to Non Final Office Action dated Aug. 28, 2018", 16 pgs.

"U.S. Appl. No. 15/224,377, Examiner Interview Summary dated Mar. 4, 2019", 5 pgs.

"U.S. Appl. No. 14/510,016, Final Office Action dated May 22, 2018".

"U.S. Appl. No. 14/510,016, Final Office Action dated Sep. 7, 2018", 34 pgs.

"U.S. Appl. No. 14/510,016, Response Filed May 7, 2018 to Non Final Office Action dated Feb. 7, 2018", 13 pgs.

"U.S. Appl. No. 14/510,016, Response filed Aug. 23, 2018 to Final Office Action dated May 22, 2018", 16 pgs.

"U.S. Appl. No. 14/612,692, Examiner Interview Summary dated May 14, 2018", 3 pgs.

"U.S. Appl. No. 14/612,692, Notice of Allowance dated Jul. 5, 2018", 11 pgs.

"U.S. Appl. No. 14/612,692, Response Filed May 9, 2018 to Non Final Office Action dated Jan. 9, 2018", 15 pgs.

"U.S. Appl. No. 14/634,417, Notice of Allowance dated May 22, 2018", 9 pgs.

"U.S. Appl. No. 14/967,472, Final Office Action dated Jun. 25, 2018", 14 pgs.

"U.S. Appl. No. 14/967,472, Response filed Sep. 21, 2018 to Final Office Action dated Jun. 25, 2018", 11 pgs.

"U.S. Appl. No. 15/074,029, Advisory Action dated Oct. 11, 2018", 3 pgs.

"U.S. Appl. No. 15/074,029, Final Office Action dated Jun. 28, 2018", 22 pgs.

"U.S. Appl. No. 15/074,029, Response filed Aug. 28, 2018 to Final Office Action dated Jun. 28, 2018", 21 pgs.

"U.S. Appl. No. 15/137,608, Non Final Office Action dated Nov. 2, 2018", 10 pgs.

"U.S. Appl. No. 15/152,975, Examiner Interview Summary dated May 14, 2018", 3 pgs.

"U.S. Appl. No. 15/152,975, Final Office Action dated Jul. 2, 2018", 19 pgs.

"U.S. Appl. No. 15/152,975, Non Final Office Action dated Sep. 28, 2018", 28 pgs.

"U.S. Appl. No. 15/152,975, Response Filed May 10, 2018 to Non Final Office Action dated Jan. 10, 2018", 13 pgs.

"U.S. Appl. No. 15/152,975, Response filed Sep. 19, 2018 to Final Office Action dated Jul. 2, 2018", 14 pgs.

"U.S. Appl. No. 15/224,312, Final Office Action dated Apr. 20, 2018", 22 pgs.

"U.S. Appl. No. 15/224,312, Non Final Office Action dated Oct. 22, 2018", 15 pgs.

"U.S. Appl. No. 15/224,312, Response filed Aug. 20, 2018 to Final Office Action dated Apr. 20, 2018", 16 pgs.

"U.S. Appl. No. 15/224,343, Final Office Action dated Apr. 19, 2018", 20 pgs.

"U.S. Appl. No. 15/224,343, Non Final Office Action dated Sep. 4, 2018", 20 pgs.

"U.S. Appl. No. 15/224,343, Response filed Jul. 19, 2018 to Final Office Action dated Apr. 19, 2018", 16 pgs.

"U.S. Appl. No. 15/224,355, Final Office Action dated Apr. 24, 2018", 20 pgs.

"U.S. Appl. No. 15/224,355, Non Final Office Action dated Dec. 20, 2018", 14 pgs.

"U.S. Appl. No. 15/224,355, Response filed Sep. 24, 2018 to Final Office Action dated Apr. 24, 2018", 19 pgs.

"U.S. Appl. No. 15/224,359, Non Final Office Action dated Sep. 28, 2018", 15 pgs.

"U.S. Appl. No. 15/224,359, Response filed Sep. 4, 2018 to Final Office Action dated Apr. 2, 2018", 14 pgs.

"U.S. Appl. No. 15/224,365, Non Final Office Action dated Jan. 3, 2019", 11 pgs.

"U.S. Appl. No. 15/224,365, Resonse filed Oct. 2, 2018 to Final Office Action dated Apr. 2, 2018", 15 pgs.

"U.S. Appl. No. 15/224,372, Final Office Action dated Apr. 3, 2018", 18 pgs.

"U.S. Appl. No. 15/224,372, Non Final Office Action dated Sep. 14, 2018", 20 pgs.

"U.S. Appl. No. 15/224,372, Response filed Aug. 3, 2018 to Final Office Action dated Apr. 3, 2018", 14 pgs.

"U.S. Appl. No. 15/224,377, Non Final Office Action dated Jun. 15, 2018", 19 pgs.

"U.S. Appl. No. 15/224,377, Response filed Dec. 17, 2018 to Non Final Office Action dated Jun. 15, 2018", 13 pgs.

"U.S. Appl. No. 15/224,383, Examiner Interview Summary dated Aug. 15, 2018", 4 pgs.

(56) References Cited

OTHER PUBLICATIONS

"U.S. Appl. No. 15/224,383, Non Final Office Action dated Jul. 5, 2018", 19 pgs.
"U.S. Appl. No. 15/224,383, Response filed Jun. 14, 2018 to Final Office Action dated Feb. 14, 2018", 14 pgs.
"U.S. Appl. No. 15/224,383, Response Filed Dec. 5, 2018 to Non Final Office Action dated Jul. 5, 2018", 16 pgs.
"U.S. Appl. No. 15/298,806, Examiner Interview Summary dated Aug. 13, 2018", 3 pgs.
"U.S. Appl. No. 15/298,806, Non Final Office Action dated May 17, 2018", 16 pgs.
"U.S. Appl. No. 15/298,806, Notice of Allowance dated Sep. 19, 2018", 5 pgs.
"U.S. Appl. No. 15/298,806, Response filed Aug. 10, 2018 to Non Final Office Action dated May 17, 2018", 15 pgs.
"U.S. Appl. No. 15/729,582, Final Office Action dated Dec. 13, 2018", 14 pgs.
"U.S. Appl. No. 15/729,582, Non Final Office Action dated May 25, 2018", 14 pgs.
"U.S. Appl. No. 15/787,467, Corrected Notice of Allowability dated Sep. 24, 2018", 2 pgs.
"U.S. Appl. No. 15/787,467, Non Final Office Action dated Apr. 18, 2018", 17 pgs.
"U.S. Appl. No. 15/787,467, Notice of Allowance dated Aug. 31, 2018", 8 pgs.
"U.S. Appl. No. 15/787,467, Response filed Jul. 18, 2018 to Non Final Office Action dated Apr. 18, 2018", 12 pgs.
"U.S. Appl. No. 15/946,990, Non Final Office Action dated Dec. 3, 2018", 10 pgs.
"U.S. Appl. No. 16/000,657, Preliminary Amendment filed Jun. 6, 2018", 8 pgs.
"U.S. Appl. No. 16/204,886, Non Final Office Action dated Jan. 4, 2019", 8 pgs.
"U.S. Appl. No. 16/212,313, Preliminary Amendment filed Dec. 12, 2018", 6 pgs.
"Canadian Application Serial No. 2,894,332, Request for Reinstatement filed Jun. 11, 2018", w/ Amended Claims, 17 pgs.
"Canadian Application Serial No. 2,910,158, Office Action dated Jun. 6, 2018", 5 pgs.
"European Application Serial No. 15782165.3, Communication Pursuant to Article 94(3) EPC dated Sep. 14, 2018", 7 pgs.
Chen, Datong, et al., "Protecting Personal Identification in Video", Protecting Privacy in Video Surveillance, Springer-Verlag London Ltd., (2009), 115-128.
Vaas, Lisa, "StealthText, Should You Choose to Accept It", URL: http://www.eweek.com/print/c/a/MessagingandCollaboration/StealthTextShouldYouChoosetoAcceptIt, (Dec. 13, 2005), 2 pgs.
U.S. Appl. No. 16/212,313, filed Dec. 6, 2018, Apparatus and Method for Accelerated Display of Ephemeral Messages.
U.S. Appl. No. 15/947,350, filed Apr. 6, 2018, Automated Chronological Display of Ephemeral Message Gallery.
U.S. Appl. No. 16/000,657, filed Jun. 5, 2018, Ephemeral Gallery of Ephemeral Messages With Opt-In Permanence.
U.S. Appl. No. 15/946,990, filed Apr. 6, 2018, Message Destination List Mechanism.
U.S. Appl. No. 16/219,577, filed Dec. 13, 2018, Geo-Location Based Event Gallery.
U.S. Appl. No. 16/204,886, filed Nov. 29, 2018, Prioritization of Messages Within a Message Collection.
"U.S. Appl. No. 14/634,417, Corrected Notice of Allowability dated Mar. 11, 2019", 3 pgs.
"U.S. Appl. No. 14/634,417, Corrected Notice of Allowability dated Mar. 20, 2019", 3 pgs.
"U.S. Appl. No. 14/967,472, Corrected Notice of Allowability dated Mar. 18, 2019", 3 pgs.
"U.S. Appl. No. 15/224,372, Final Office Action dated Mar. 6, 2019", 17 pgs.
"U.S. Appl. No. 15/074,029, Response filed Apr. 23, 2019 to Non Final Office Action dated Jan. 23, 2019", 15 pgs.
"U.S. Appl. No. 15/224,365, Response filed Jun. 3, 2019 to Non-Final Office Action dated Jan. 3, 2019", 12 pgs.
"U.S. Appl. No. 15/946,990, Final Office Action dated May 9, 2019", 11 pgs.
"U.S. Appl. No. 15/137,608, Final Office Action dated May 13, 2019", 10 pgs.
"U.S. Appl. No. 15/729,582, Response filed May 13, 2019 to Final Office Action dated Dec. 13, 2018", 9 pgs.
"U.S. Appl. No. 15/224,383, Response filed May 14, 2019 to Final Office Action dated Jan. 14, 2019", 15 pgs.
"U.S. Appl. No. 15/224,355, Response filed May 20, 2019 to Non Final Office Action dated Dec. 20, 2018", 13 pgs.
"U.S. Appl. No. 15/152,975, Notice of Allowance dated May 17, 2019", 13 pgs.
"U.S. Appl. No. 15/224,377, Response filed Jun. 6, 2019 to Final Office Action dated Feb. 6, 2019", 10 pgs.
"U.S. Appl. No. 16/204,886, Notice of Allowance dated May 15, 2019", 9 pgs.
"U.S. Appl. No. 15/224,343, Final Office Action dated Mar. 22, 2019", 17 pgs.
"U.S. Appl. No. 14/967,472, Corrected Notice of Allowability dated Apr. 24, 2019", 3 pgs.
"U.S. Appl. No. 15/224,359, Final Office Action dated Apr. 11, 2019", 15 pgs.
"U.S. Appl. No. 15/224,312, Final Office Action dated Apr. 11, 2019", 15 pgs.
"U.S. Appl. No. 16/204,886, Response filed Apr. 2, 2019 to Non Final Office Action dated Jan. 4, 2019", 8 pgs.
"U.S. Appl. No. 15/074,029, Corrected Notice of Allowability dated Aug. 20, 2019", 10 pgs.
"U.S. Appl. No. 15/137,608, Notice of Allowance dated Aug. 8, 2019", 7 pgs.
"U.S. Appl. No. 15/137,608, Response filed Jul. 12, 2019 to Final Office Actiondate May 13, 2019", 10 pgs.
"U.S. Appl. No. 15/224,312, Advisory Action dated Aug. 27, 2019", 3 pgs.
"U.S. Appl. No. 15/224, 312, Response filed Aug. 12, 2019 to Final Office Action dated Apr. 11, 2019", 14 pgs.
"U.S. Appl. No. 15/224,343, Response filed Aug. 22, 2019 to Final Office Action dated Mar. 22, 2019", 16 pgs.
"U.S. Appl. No. 15/224,355, Final Office Action dated Aug. 9, 2019", 15 pgs.
"U.S. Appl. No. 15/224,359, response filed Sep. 11, 2019 to Final Office Action dated Apr. 11, 2019", 18 pgs.
"U.S. Appl. No. 15/224,365, Final Office Action dated Aug. 23, 2019", 12 pgs.
"U.S. Appl. No. 15/224,372, response filed Jul. 8, 2019 to Final Office Action dated Mar. 6, 2019", 14 pgs.
"U.S. Appl. No. 15/224,383, Non-Final Office Action dated Sep. 23, 2019", 13 pgs.
"U.S. Appl. No. 15/729,582, Notice of Allowance dated Jul. 22, 2019", 9 pgs.
"U.S. Appl. No. 15/946,990, Response filed Jul. 9, 2019 to Final Office Action dated May 9, 2019", 12 pgs.
"U.S. Appl. No. 16/204,886, Corrected Notice of Allowability dated Jul. 15, 2019", 2 pgs.
"U.S. Appl. No. 16/204,886, Corrected Notice of Allowability dated Aug. 6, 2019", 2 pgs.
"U.S. Appl. No. 16/204,886, Corrected Notice of Allowability dated Sep. 10, 2019", 2 pgs.
"U.S. Appl. No. 16/212,313, Non Final Office Action dated Aug. 30, 2019", 18 pgs.
"U.S. Appl. No. 16/219,577, Restriction Requirement dated Aug. 7, 2019", 6 pgs.
"U.S. Appl. No. 16/376,598, Non Final Office Action dated Jul. 25, 2019", 7 pgs.
"U.S. Appl. No. 16/511,834, Non-Final Office Action dated Aug. 20, 2019", 11 pgs.

| ⎯700 | ⎯702 | ⎯704 |
|---|---|---|
| Message_1 | 10 Seconds | 120 Minutes Left |
| Message_2 | 5 Seconds | 360 Minutes Left |
| Message_3 | 5 Seconds | 1200 Minutes Left |
| Message_4 | 10 Seconds | 1320 Minutes Left |

FIG. 7

EPHEMERAL GALLERY OF EPHEMERAL MESSAGES

CLAIM OF PRIORITY

This application is a continuation and claims the benefit of priority of U.S. patent application Ser. No. 15/224,312, filed Jul. 29, 2016 which is a continuation and claims the benefit of priority of U.S. patent application Ser. No. 14/505,478, filed Oct. 2, 2014, which is hereby incorporated by reference herein in its entirety.

FIELD OF THE INVENTION

This invention relates generally to the display of computer network delivered ephemeral messages. More particularly, this invention relates to an ephemeral gallery of ephemeral messages.

BACKGROUND OF THE INVENTION

Messages (e.g., text, photo or video) delivered over computer networks are well known. However, one problem associated with such messages is that they require an affirmative act on the part of a user to delete or remove messages from their devices once the messages have been viewed or read. As a result, in some instances, users refrain from spontaneously sending many messages for fear of filling, or cluttering a recipient's in-box.

In view of the foregoing, it would be desirable to maintain spontaneity and expand communicative content of messaging activity, while reducing the device management burdens imposed upon a message recipient.

SUMMARY OF THE INVENTION

A server has a processor and a memory storing instructions executed by the processor to maintain an ephemeral gallery of ephemeral messages. An ephemeral message is posted to the ephemeral gallery. The ephemeral message has an associated message duration parameter and a gallery participation parameter. An ephemeral message is removed from the ephemeral gallery in response to the identification of an expired gallery participation parameter.

BRIEF DESCRIPTION OF THE FIGURES

The invention is more fully appreciated in connection with the following detailed description taken in conjunction with the accompanying drawings, in which:

FIG. 7 illustrates an ephemeral gallery data structure associated with an embodiment of the invention.

Like reference numerals refer to corresponding parts throughout the several views of the drawings.

DETAILED DESCRIPTION OF THE INVENTION

Figure 1:
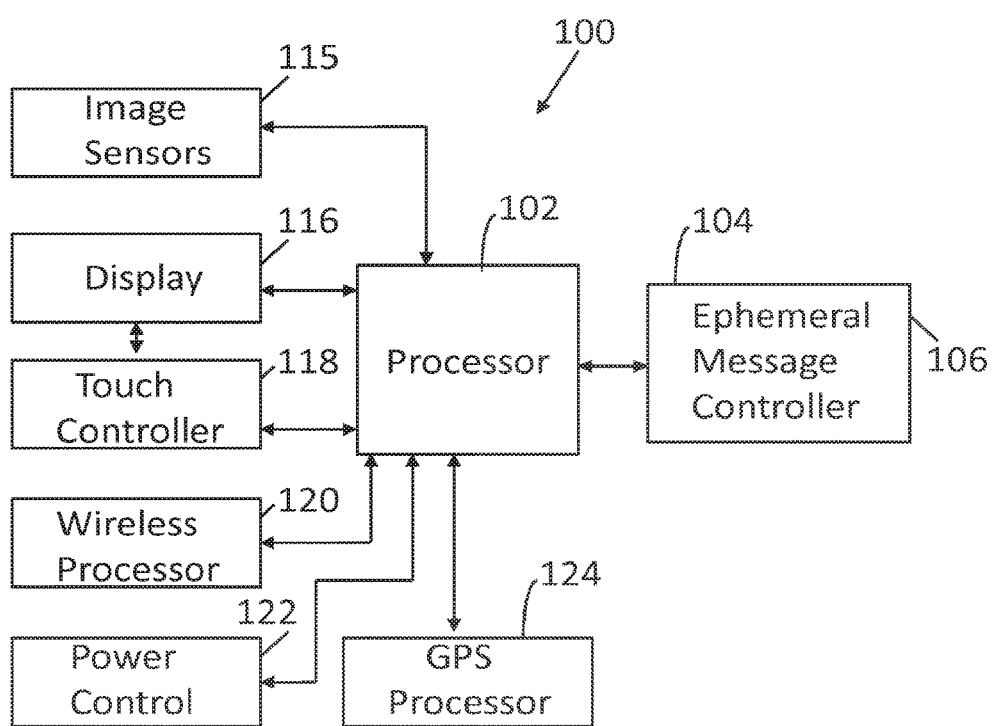
FIG. 1 illustrates components of an electronic device utilized in accordance with the invention.

FIG. 1 illustrates an electronic device 100. In one embodiment, the electronic device 100 is a smartphone with a processor 102 in communication with a memory 104. The processor 102 may be a central processing unit and/or a graphics processing unit. The memory 104 is a combination of flash memory and random access memory. The memory 104 stores an ephemeral message controller 106 to implement operations of the invention. The ephemeral message controller 106 may include executable instructions to access a server which coordinates operations disclosed herein. Alternately, the ephemeral message controller 106 may include executable instructions to coordinate, some of the operations disclosed herein, while the server implements other operations.

An ephemeral message may be a text, an image, a video and the like. The display time for the ephemeral message is typically set by the message sender. However, the display time may be a default setting or a setting specified by the recipient. Regardless of the setting technique, the message is transitory (i.e., the message is deleted or otherwise made inaccessible after a certain period of time or after a certain action has been taken).

The processor 102 is also coupled to image sensors 115. The image sensors 115 may be known digital image sensors, such as charge coupled devices. The image sensors capture visual media, which is presented on display 116.

A touch controller 118 is connected to the display 116 and the processor 102. The touch controller 118 is responsive to haptic signals applied to the display 116. In one embodiment, the ephemeral message controller 106 monitors signals from the touch controller 118. If haptic contact is observed by the touch controller 118 in connection with indicia of an ephemeral gallery, then the ephemeral gallery is displayed to the user as a sequence of ephemeral messages.

The electronic device 100 may also include other components commonly associated with a smartphone, such as a wireless signal processor 120 to provide connectivity to a wireless network. A power control circuit 122 and a global positioning system processor 124 may also be utilized. While many of the components of FIG. 1 are known in the art, new functionality is achieved through the ephemeral message controller 106 operating in conjunction with a server.

Figure 2:
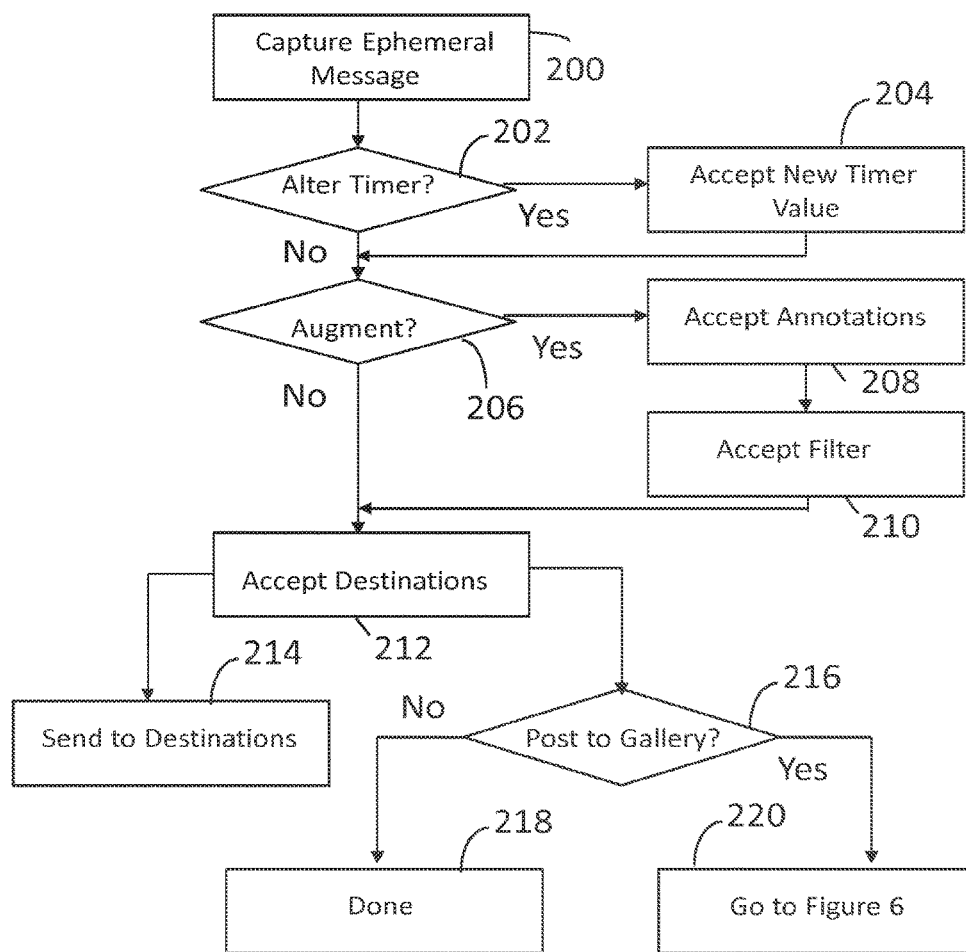
FIG. 2 illustrates processing operations associated with an embodiment of the invention.
Figure 3:
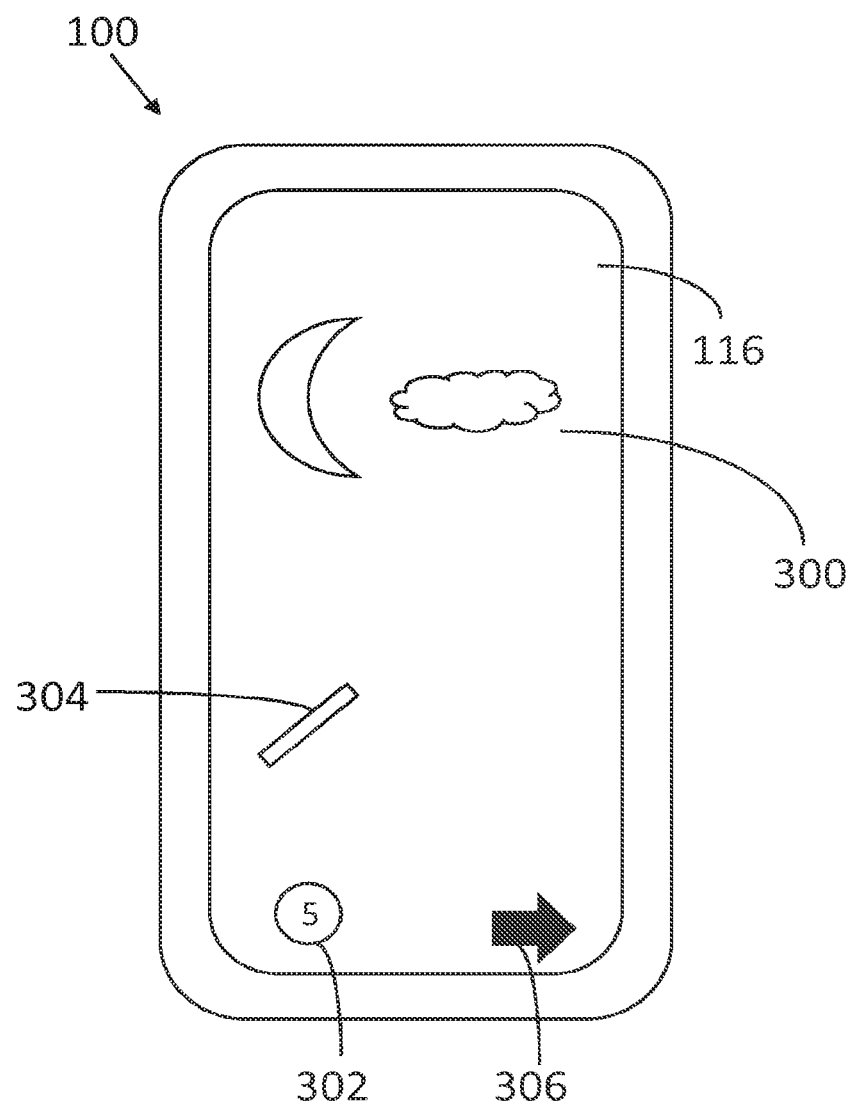
FIG. 3 illustrates an electronic device for capturing and augmenting an ephemeral message.

FIG. 2 illustrates processing operations associated with the ephemeral message controller 106. Initially, an ephemeral message is captured 200. FIG. 3 illustrates electronic device 100 and touch display 116 with a photograph 300 operative as an ephemeral message.

The next processing operation of FIG. 2 is to determine whether to alter a timer or a message duration parameter 202. FIG. 3 illustrates an example of indicia 302 of a message duration parameter. In this example, the indicia indicates a default of 5 seconds as the message duration parameter. If the indicia is engaged (e.g., through haptic contact), then a prompt may be supplied for a new message duration parameter (e.g., 10 seconds). Such activity (202—Yes) results in the acceptance of the new timer value 204. If a new timer value is specified or no alteration of a timer transpires (202—No) control proceeds to block 206. The user may be prompted to augment the ephemeral message. As shown in FIG. 3, a drawing tool 304 may be supplied to allow a user to add a hand drawn message. The drawing tool 304 may be manipulated by haptic contact to enter a message or annotation of visual media. Alternately or in addition, a keyboard may be used to type augment a message. For example, a tap on the touch display 116 may result in a keyboard being displayed, which allows a user to enter a typed message.

As shown in FIG. 2, annotations may be accepted 208 in this manner. Augmentation may also be in the form of photograph filters. That is, photograph filters may be accepted 210. For example, a first right-to-left swipe motion on the touch display 116 may drag a first filter on top of the photograph. A second right-to-left swipe motion on the touch display 116 may drag a second filter on top of the photograph. Filter processing of this type is described in commonly owned U.S. Ser. No. 14/325,270, filed Jul. 7, 2014, the contents of which are incorporated herein by reference.

Figure 4:
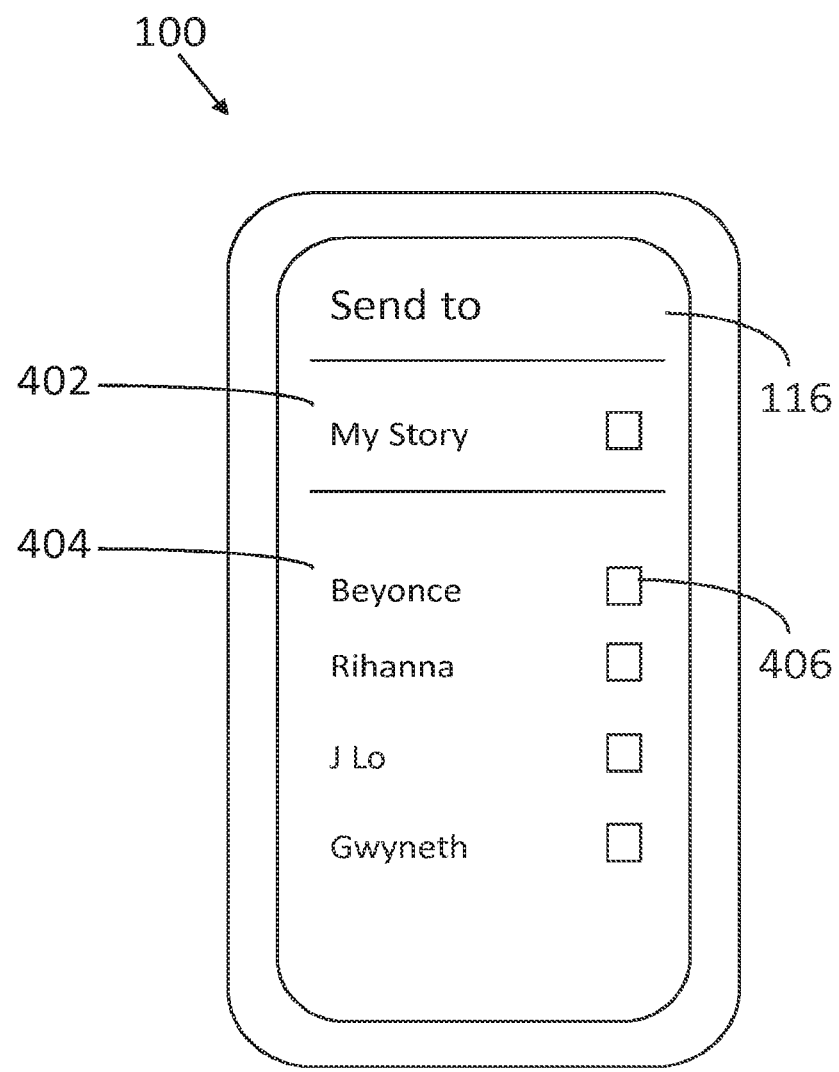
FIG. 4 illustrates an ephemeral message destination routing interface that may be used in accordance with an embodiment of the invention.

The next operation of FIG. 2 is to accept destinations 212. As more fully described below, a destination may be used to identify intended recipients of a message or a location or "gallery" where one or more messages may be accessed. FIG. 3 illustrates an icon 306 to invoke a destination list. Haptic contact on the icon may result in a destination list of the type shown in FIG. 4. FIG. 4 illustrates an electronic device 100 displaying a destination list. The destination list may include a destination of "My Story" 402, where "My Story" is a reference to an ephemeral gallery of ephemeral messages. The destination list may also include a friends or contacts section 404 listing various friends that may be ephemeral message recipients. Haptic contact with a box 406 associated with a listed individual or story places the corresponding individual or story on a destination list.

Figure 6:
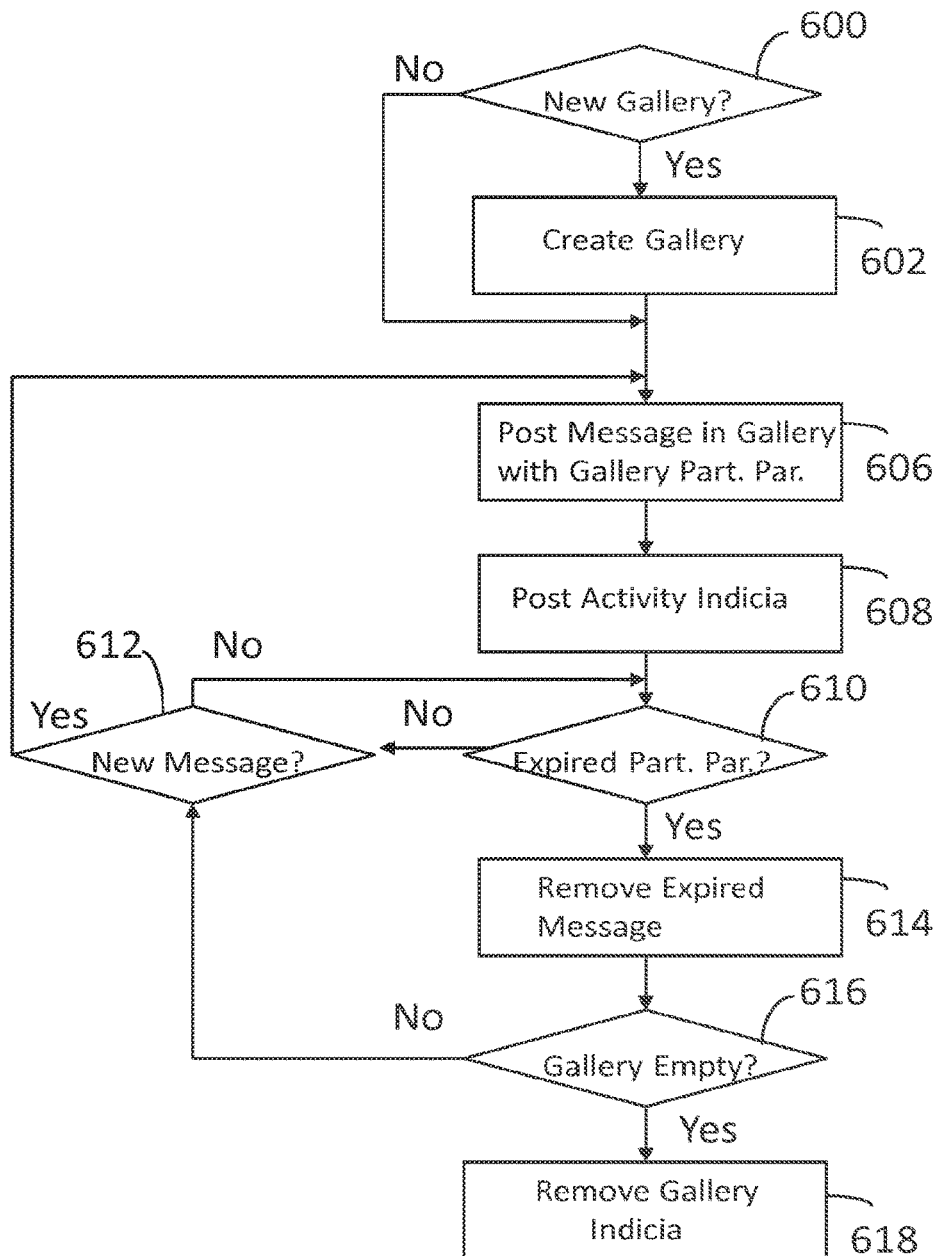
FIG. 6 illustrates ephemeral gallery processing operations associated with an embodiment of the invention.

Returning to FIG. 2, after the destination list is specified, the ephemeral message is sent to the specified destinations 214. For example, the ephemeral message is sent to friends selected from section 404, if any. A check is also made to determine whether the message should be posted to an ephemeral gallery 216. If not (216—No), processing is completed. If so (216—Yes), the processing of FIG. 6 is performed 220. Thus, it is possible to send a message to one or more friends and/or post to an ephemeral gallery.

Figure 5:
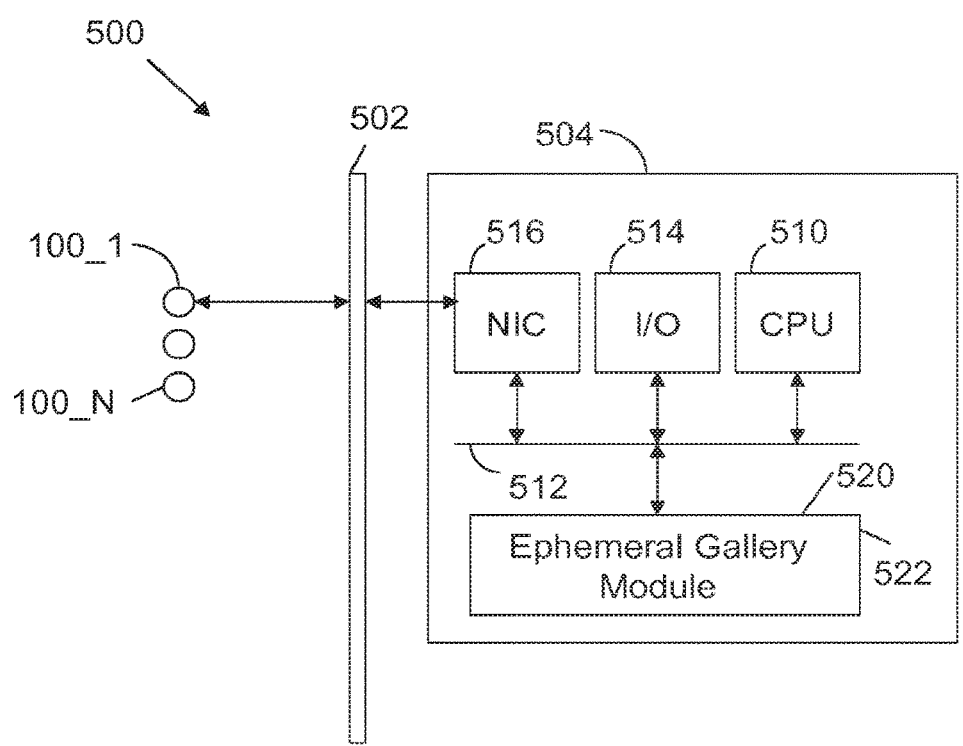
FIG. 5 illustrates a system to implement an embodiment of the invention.

FIG. 5 illustrates a system 500. The figure presents a simplified representation of a set of electronic devices 100_1 through 100_N, where each electronic device may be configured as the device of FIG. 1. Each electronic device is in communication with a network 502, which may be any combination of wireless and wired networks.

A server 504 is also connected to the network 502. The server 504 includes standard components, such as a central processing unit 510 connected to input/output devices 514 via a network 512. The input/output devices 514 may include a keyboard, mouse, display and the like. A network interface circuit 516 is also connected to the bus 512 to provide connectivity to network 502. A memory 520 is also connected to the bus 512. The memory 520 stores an ephemeral gallery module 522. The ephemeral gallery module 522 stores instructions executed by the central processing unit 510 to implement operations of the invention. For example, the ephemeral gallery module 522 may include instructions to coordinate the processing operations of FIG. 2. These operations may be controlled by the ephemeral gallery module 522 or they may be performed in conjunction with selective operations performed by the ephemeral message controller 106.

FIG. 6 illustrates ephemeral gallery module 522 operations performed in accordance with an embodiment of the invention. The first operation of FIG. 6 is to determine whether a new gallery is needed 600. As discussed in connection with FIG. 4, designating "My Story" 402 as a message recipient results in a post of an ephemeral message to an ephemeral gallery. If a gallery does not exist (600—Yes), then a new gallery is created 602. Alternately, if a gallery does exist and a user wants to create a new gallery, then the new gallery is created 602. The user may be supplied a prompt to indicate whether an existing gallery should be used or a new gallery should be designated.

The message is then posted in the gallery with a gallery participation parameter 606. The gallery participation parameter is an ephemeral period of time that the ephemeral message will continue to exist in the gallery. For example, a first ephemeral message posted to the gallery may have a default gallery participation parameter of 24 hours. In other instances, the gallery participation parameter may be set by a user. The gallery participation parameter value decreases with the passage of time. Thus, in this embodiment, an ephemeral message gallery subsists for as long as the gallery participation parameter of the last message posed to the gallery.

In another embodiment, a gallery timer may be assigned to a gallery by a user. The gallery timer may be used to establish a lifespan of an associated gallery and messages posted to this gallery subsist for no longer than the life of the gallery. Thus, in some embodiments, all messages posted to such a gallery will subsist for the duration of the life of the gallery (regardless of posting time). In other embodiments, messages may be submitted with a gallery participation parameter. In these embodiments, messages expire and become inaccessible at the earlier of the gallery participation parameter or the remaining life of the gallery.

The next processing operation of FIG. 6 is to post activity indicia 608. Examples of activity indicia are provided below. A check is then made to determine whether there is an expired participation parameter 610. If so (610—Yes), the ephemeral message associated with the expired participation parameter is removed from the ephemeral gallery 614. If as a result of this removed message the gallery is empty (616—Yes), then the ephemeral gallery terminates and indicia of the gallery is removed 618. If the gallery is not empty (616—No), a check is made for a new message 612. If a new message exists (612—Yes), then processing returns to block 604. If a new message does not exist (612—No), then processing returns to block 610. If an expired participation parameter does not exist (610—No), then a check is made once again for a new message 612.

FIG. 7 illustrates a data structure for an ephemeral message gallery. A first column 700 may have a list of messages. Another column 702 may have a list of message duration parameters for individual messages. Another column 704 may have a list of gallery participation parameters for individual messages. Observe in this example that the values in column 702 add up to 30 seconds. Thus, the ephemeral message gallery in this example has four messages that will take 30 seconds to display. Further observe that the oldest message (Message_1) is displayed first and will be removed in 120 minutes. In this example, the newest message (Message_4) will remain in the ephemeral gallery for 1320 minutes at which point the ephemeral gallery will expire, unless another message is posted. The arrival of a new message alters the gallery timer, but does not alter gallery participation parameters.

Figure 8:
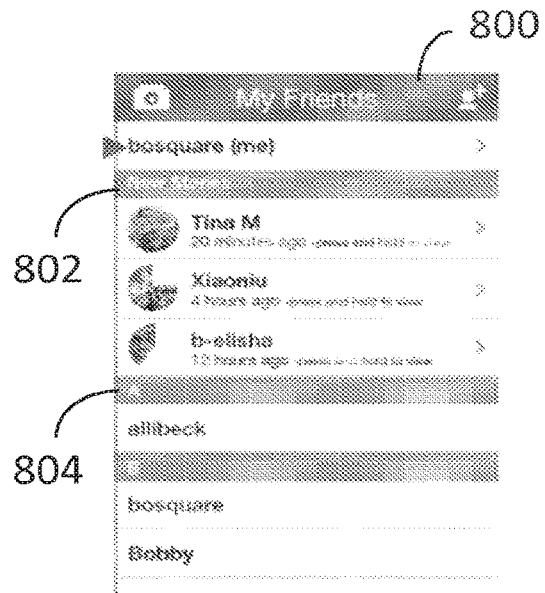
FIG. 8 illustrates ephemeral gallery indicia associated with an embodiment of the invention.

FIG. 8 illustrates an interface 800 with a section 802 that designates available ephemeral message galleries (stories) and a section 804 with a listing of friends (available destinations for an ephemeral message). Observe that section 802 has indicia of ephemeral message gallery activity. FIG. 8 provides example indicia, of the time that the last message was posted to the ephemeral message gallery. FIG. 8 also provides example graphical indicia of the amount of time remaining for an ephemeral message gallery. Observe that the first entry was posted 20 minutes ago and therefore has a full circle indicative of the time remaining for that ephemeral message gallery. On the other hand, the third entry was posted 12 hours ago and has approximately half a circle to indicate the time remaining for that ephemeral message gallery. This example contemplates a 24 hour period for an ephemeral message gallery. Naturally, other time periods may be utilized in accordance with embodiments of the invention.

Figure 9:
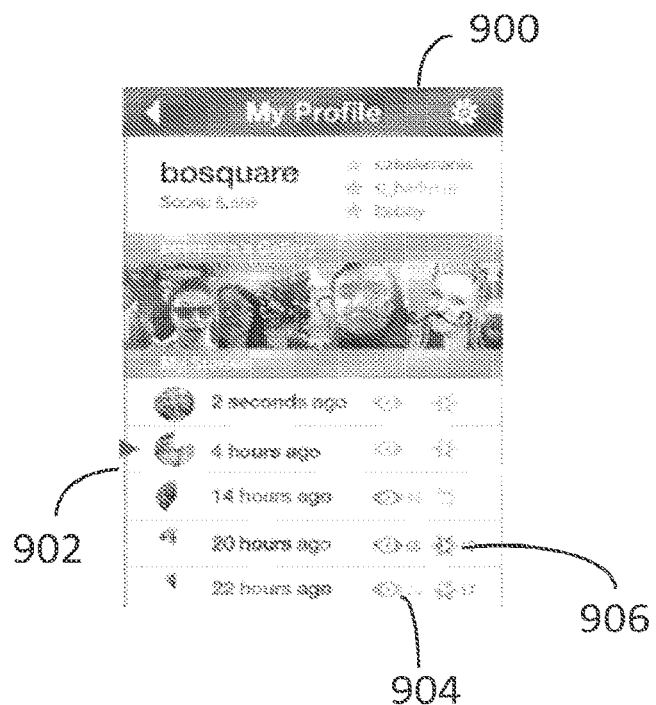
FIG. 9 illustrates ephemeral gallery indicia associated with another embodiment of the invention.

FIG. 9 illustrates an interface 900 with information on a user's stories. Individual stories 902 have indicia of the amount of time remaining. Indicia 904 of the number of ephemeral gallery views is also provided. Indicia 906 of screenshots taken of an ephemeral message is also provided. This information is significant since the intent of the message was that it be ephemeral. If a message recipient overrides this intent by taking a screen shot, then the message sender is advised.

Figure 10:
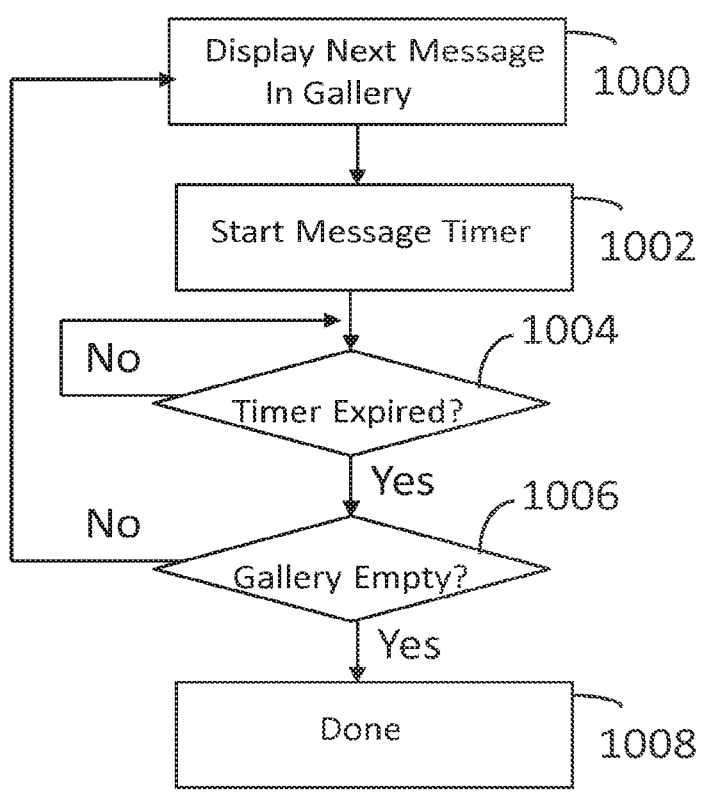
FIG. 10 illustrates operations performed in response to an ephemeral gallery view request.

FIG. 10 illustrates processing operations performed by the ephemeral gallery module 522 in response to a request for an ephemeral message gallery. As shown in FIG. 8, a user receives a list of 802 of available stories. Haptic contact with indicia of a story is operative as a request to view an ephemeral message gallery.

The first operation in FIG. 10 is to display the next message in the gallery 1000. In the example of FIG. 7, the oldest message is the first message to be displayed. A message timer is then started 1002. The message timer expires at the end of the message duration parameter for the displayed ephemeral message. In the example of FIG. 7, the first message (Message_1) is displayed for 10 seconds. Block 1004 checks for the timer to expire. Upon expiration of the timer (1004—Yes), a check is made to determine if the gallery is empty 1006. If so (1006—Yes), processing is completed 1008. If not (1006—No), processing returns to block 1000. This processing loop is repeated until the gallery is empty.

Figure 11:
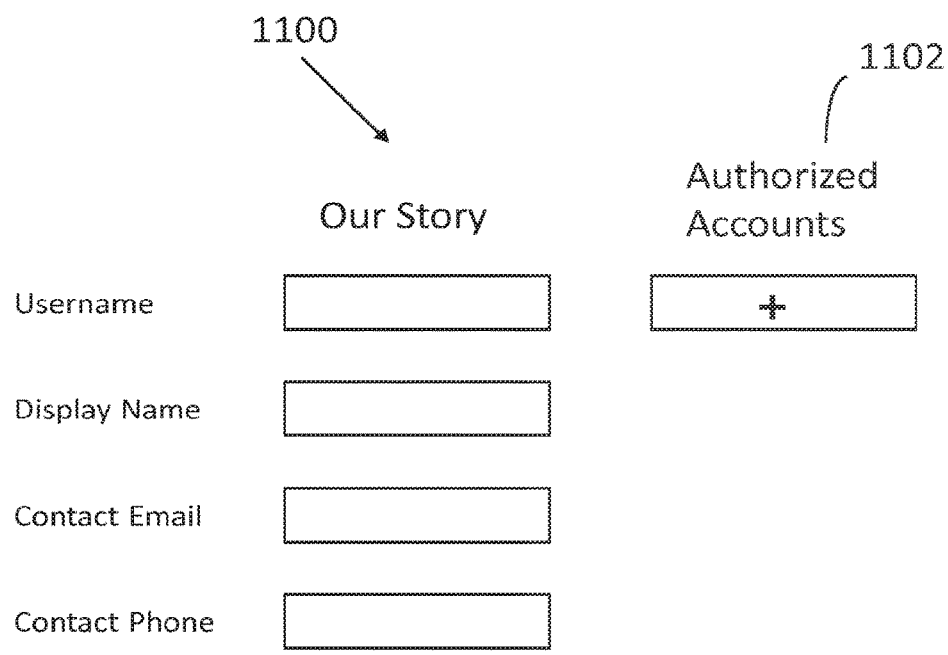
FIG. 11 illustrates an account administration interface to establish an ephemeral gallery that receives ephemeral messages from multiple users.

FIG. 11 illustrates an account administration interface 1100 to establish an ephemeral gallery that receives ephemeral messages from multiple users. Such a feature may be used to facilitate celebrity or organizational accounts where numerous authorized users are allowed to post on behalf of a single account. In one embodiment, a username, display name, contact email and contact phone are specified by an account administrator. An authorized accounts prompt 1102 allows the account administrator to add other users to the ephemeral gallery. For example, activation of the prompt 1102 may result in prompts for a username, display name, contact email and/or contact phone. Alternately, of the prompt 1102 may result in an interface of the type shown in FIG. 4 through which authorized accounts may be added.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are nest limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise firms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system comprising:
one or more processors; and
one or more memories storing instructions executed by the one or more processors to:
  maintain an ephemeral gallery comprising a plurality of ephemeral messages posted for viewing by one or more recipients, wherein the plurality of ephemeral messages comprises respective photographic or video content, the maintaining of the ephemeral gallery comprising making the ephemeral gallery available for viewing, upon request, via respective user devices associated with the one or more recipients;
  for each of the plurality of ephemeral messages:
    maintain an associated message duration parameter that indicates a display duration of the corresponding ephemeral message during viewing of the ephemeral gallery; and
    maintain a gallery participation parameter that indicates a time value for continued availability of the corresponding ephemeral message for viewing by the one or more recipients;
  responsive to receiving a request from one of the one or more recipients over a computer network, cause automated sequential display of the plurality of ephemeral messages on a corresponding user device by performance of operations comprising:

starting a message timer when display of one of the ephemeral messages is commenced, the message timer expiring when the message timer equals the display duration of the corresponding ephemeral message;

responsive to expiry of the message timer, displaying a next one of the plurality of ephemeral messages in the ephemeral gallery; and repeating the operations of starting the message timer and displaying the next ephemeral message until all ephemeral messages in the ephemeral gallery are viewed;

remove a particular one of the plurality of ephemeral messages from the ephemeral gallery in response to identification of an expired gallery participation parameter corresponding to the particular ephemeral message, the particular ephemeral message after removal thereof being unavailable for viewing by the one or more recipients as part of the ephemeral gallery; and eliminate the ephemeral gallery so that the ephemeral gallery is unavailable for viewing over the computer network by the one or more recipients, the ephemeral gallery being eliminated upon expiration of the gallery participation parameter of a last message in the ephemeral gallery, the last message being that one of the plurality of ephemeral messages posted to the ephemeral gallery most recently.

2. The system of claim 1, wherein the one or more memories include instructions to cause the processor to:
receive from a user associated with the ephemeral gallery a newly posted ephemeral message;
store the newly posted ephemeral message and a corresponding message duration parameter; and
associate the newly posted ephemeral message with the ephemeral gallery.

3. The system of claim 2, wherein the corresponding message duration parameter is set by the user.

4. The system of claim 2, wherein the newly posted ephemeral message includes augmentations made by the user to the photographic or video content of the newly posted ephemeral message.

5. The system of claim 2, wherein the newly posted ephemeral message includes annotations made by the user.

6. The system of claim 5, wherein the annotations are text annotations.

7. The system of claim 5, wherein the annotations are drawing annotations.

8. The system of claim 1, wherein the corresponding message duration parameter is a default parameter.

9. The system of claim 1, wherein the one or more memories includes instructions for causing the one or more processors to post indicia of ephemeral gallery activity to a graphical user interface for the ephemeral gallery on a user device.

10. The system of claim 9, wherein the indicia of ephemeral gallery activity include indicia pertaining to the posting time of the last message in the ephemeral gallery.

11. The system of claim 9, wherein the indicia of ephemeral gallery activity include indicia of an amount of time remaining before the ephemeral gallery is made unavailable for viewing by the one or more recipients.

12. A method comprising:
maintaining an ephemeral gallery comprising a plurality of ephemeral messages posted for viewing by one or more recipients, wherein the plurality of ephemeral messages comprises respective photographic or video content, the maintaining of the ephemeral gallery comprising making the ephemeral gallery available for viewing, upon request, via respective user devices associated with the one or more recipients, the maintaining of the ephemeral gallery comprising, for each of the plurality of ephemeral messages:
maintaining an associated message duration parameter that indicates a display duration of the corresponding ephemeral message during viewing of the ephemeral gallery; and
maintaining a gallery participation parameter that indicates a time value for continued availability of the corresponding ephemeral message for viewing by the one or more recipients;

responsive to receiving a request from one of the one or more recipients, automatically causing automated sequential display of the plurality of ephemeral messages on a corresponding user device by performance of operations comprising:
starting a message timer when display of one of the ephemeral messages is commenced, the message timer expiring when the message timer equals the display duration of the corresponding ephemeral message;
responsive to expiry of the message timer, displaying a next one of the plurality of ephemeral messages in the ephemeral gallery; and
repeating the operations of starting the message timer and displaying the next ephemeral message until all ephemeral messages in the ephemeral gallery are viewed;

using one or more computer processors, automatically removing a particular one of the plurality of ephemeral messages from the ephemeral gallery in response to identification of an expired gallery participation parameter corresponding to the particular ephemeral message, the particular ephemeral message after removal thereof being unavailable for viewing by the one or more recipients as part of the ephemeral gallery; and using one or more computer processors, automatically eliminating the ephemeral gallery so that the ephemeral gallery is unavailable for viewing over the computer network by the one or more recipients, the ephemeral gallery being eliminated upon expiration of the gallery participation parameter of a last message in the ephemeral gallery, the last message being that one of the plurality of ephemeral messages posted to the ephemeral gallery most recently.

13. The method of claim 12, further comprising:
receiving from a user associated with the ephemeral gallery a newly posted ephemeral message;
storing the newly posted ephemeral message and a corresponding message duration parameter; and
associating the newly posted ephemeral message with the ephemeral gallery.

14. The method of claim 13, wherein the corresponding message duration parameter is a default parameter.

15. The method of claim 13, wherein the corresponding message duration parameter is set by the user.

16. The method of claim 13, wherein the newly posted ephemeral message includes augmentations made by the user to the photographic or video content of the newly posted ephemeral message.

17. The method of claim 13, wherein the newly posted ephemeral message includes annotations made by the user.

18. The method of claim 12, further comprising causing the one or more processors to post indicia of ephemeral gallery activity to a graphical user interface for the ephemeral gallery on a user device.

19. The method of claim 18, wherein the indicia of ephemeral gallery activity includes indicia pertaining to the posting time of the last message in the ephemeral gallery.

20. A non-transitory computer-readable storage medium storing machine-readable instructions for causing a machine, when executing the instructions, to perform operations comprising:

maintaining an ephemeral gallery comprising a plurality of ephemeral messages posted for viewing by one or more recipients, wherein the plurality of ephemeral messages comprises respective photographic or video content, the maintaining of the ephemeral gallery comprising making the ephemeral gallery available for viewing, upon request, via respective user devices associated with the one or more recipients, the maintaining of the ephemeral gallery comprising, for each of the plurality of ephemeral messages:

maintaining an associated message duration parameter that indicates a display duration of the corresponding ephemeral message during viewing of the ephemeral gallery; and maintaining a gallery participation parameter that indicates a time value for continued availability of the corresponding ephemeral message for viewing by the one or more recipients;

responsive to receiving a request from one of the one or more recipients over a computer network, automatically causing automated sequential display of the plurality of ephemeral messages on a corresponding user device by performance of operations comprising:

starting a message timer when display of one of the ephemeral messages is commenced, the message timer expiring when the message timer equals the display duration of the corresponding ephemeral message;

responsive to expiry of the message timer, displaying a next one of the plurality of ephemeral messages in the ephemeral gallery; and repeating the operations of starting the message timer and displaying the next ephemeral message until all ephemeral messages in the ephemeral gallery are viewed;

automatically removing a particular one of the plurality of ephemeral messages from the ephemeral gallery in response to identification of an expired gallery participation parameter corresponding to the particular ephemeral message, the particular ephemeral message after removal thereof being unavailable for viewing by the one or more recipients as part of the ephemeral gallery; and automatically eliminating the ephemeral gallery so that the ephemeral gallery is unavailable for viewing over the computer network by the one or more recipients, the ephemeral gallery being eliminated upon expiration of the gallery participation parameter of a last message in the ephemeral gallery, the last message being that one of the plurality of ephemeral messages posted to the ephemeral gallery most recently.

* * * * *

UNITED STATES PATENT AND TRADEMARK OFFICE
CERTIFICATE OF CORRECTION

PATENT NO. : 10,476,830 B2  
APPLICATION NO. : 15/702511  
DATED : November 12, 2019  
INVENTOR(S) : Allen et al.

Page 1 of 1

It is certified that error appears in the above-identified patent and that said Letters Patent is hereby corrected as shown below:

On the Title Page

Page 11, Column 1, item [56], Line 15, delete "ios" and insert --iOS-- therefor

Page 11, Column 1, item [56], Line 44, delete "Resonse" and insert --Response-- therefor Page 11, Column 1, item [56], Line 62, delete "Respone" and insert --Response-- therefor Page 11, Column 2, item [56], Line 59, delete "Resonse" and insert --Response-- therefor Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*